(12) United States Patent
Rosenblum et al.

(10) Patent No.: US 11,358,751 B2
(45) Date of Patent: Jun. 14, 2022

(54) STORAGE CONTAINER SYSTEMS AND METHODS

(71) Applicants: Dean Rosenblum, Peoria, AZ (US); Joshua Rosenblum, Peoria, AZ (US)

(72) Inventors: Dean Rosenblum, Peoria, AZ (US); Joshua Rosenblum, Peoria, AZ (US)

( * ) Notice: Subject to any disclaimer, the term of this patent is extended or adjusted under 35 U.S.C. 154(b) by 0 days.

(21) Appl. No.: 16/884,455

(22) Filed: May 27, 2020

(65) Prior Publication Data
US 2021/0371162 A1 Dec. 2, 2021

(51) Int. Cl.
*B65D 21/08* (2006.01)
*A47J 47/02* (2006.01)
*B65D 21/02* (2006.01)
*B65D 6/16* (2006.01)

(52) U.S. Cl.
CPC ............ *B65D 21/086* (2013.01); *A47J 47/02* (2013.01); *B65D 11/18* (2013.01); *B65D 21/0238* (2013.01); *B65D 2203/04* (2013.01)

(58) Field of Classification Search
CPC ... A47J 47/02; B65D 21/0238; B65D 21/086; B65D 21/083; B65D 11/18; B65D 2203/04
USPC .......................................... 220/521; 215/231
See application file for complete search history.

(56) References Cited

U.S. PATENT DOCUMENTS

| 180,132 | A | | 7/1876 | Hoard et al. |
| 985,106 | A | | 2/1911 | Bradshaw |
| 2,074,639 | A | * | 3/1937 | Burdick ................. B65D 25/04 220/8 |
| 2,695,115 | A | * | 11/1954 | Roop .................. B65D 21/0233 220/802 |
| 3,732,999 | A | | 5/1973 | Rounkles |
| 6,688,935 | B1 | | 2/2004 | Lin |
| 6,966,121 | B2 | | 11/2005 | Bolle |
| 8,006,839 | B2 | | 8/2011 | Hafner |
| 8,033,409 | B2 | | 10/2011 | Lindemann |
| 9,085,388 | B2 | | 1/2015 | Rosenblum |
| 9,505,524 | B2 | | 11/2016 | Rosenblum |
| 2011/0311688 | A1 | * | 12/2011 | Becraft ................ B65D 77/003 426/111 |

* cited by examiner

*Primary Examiner* — Mollie Impink
(74) *Attorney, Agent, or Firm* — Buckley, Maschoff & Talwalkar LLC

(57) ABSTRACT

A container system or apparatus is provided which includes a main container having a bottom wall and a plurality of sidewalls integrally connected to the bottom wall, the bottom wall and sidewalls having an interior face defining a first interior holding area, a sub-container having a bottom wall and a plurality of sidewalls integrally connected to the bottom wall, the bottom wall of the sub-container and the sidewalls of the sub-container having an interior face defining a second interior holding area, and a lid formed to removably mate with a top portion of the sub-container to enclose the second interior holding area, the lid and the sub-container forming a structure formed to removably mate with a top portion of the main container to enclose the first interior holding area.

11 Claims, 24 Drawing Sheets

STORAGE CONTAINER SYSTEMS AND METHODS

BACKGROUND

Various products, including dry food products and spices, are typically sold in a wide variety of retail package sizes and configurations. Some of those packages include cardboard boxes, jars, and bags of varied sizes and shapes. And even when similar products from different manufacturers or brands have substantially the same amount of product in a package, for example one pound of a particular product, the different manufacturers may each provide a different shape or package configuration. Some of the differences in package configurations may be attributable to the manufacturers trying to distinguish their product offerings from other competing brands.

Additionally, consumers and businesses are now purchasing many food products in bulk, in both retail stores and online, where the retail package is often nothing more than a plastic or paper bag.

Consumers, including residential and business users, typically store products sold in the variety of package sizes and configurations in or on shelves, counters, and pantries. However, due to the variety of package types, sizes, and configurations, the storage of products in their original retail packaging may not typically be the most efficient use of counter and/or shelf space.

Further, it is typically desired to use up older inventory of a food product first, before using a newer supply of the same or similar product—a practice often referred to as "first-in, first-out", or "FIFO". FIFO is commonly facilitated through a process known as rotation, where older product is placed in front of, or on top of newer product until the older product is fully consumed. However, keeping newer product separate from older product until the older product is fully consumed increases the number and variety of packages in storage, further contributing to inefficient utilization of storage space, while introducing new challenges to keeping storage areas well organized and easily accessible.

Accordingly, it would be desirable to provide container systems and methods that address these and other problems. Other advantages and features will become apparent upon reading the following disclosure.

DESCRIPTION

Embodiments herein relate to container systems that provide, in various configurations, convenient and efficient storage for a wide variety and types of items. Pursuant to some embodiments, container systems and apparatus are provided which include a main container having a bottom wall and a plurality of sidewalls integrally connected to the bottom wall, the bottom wall and sidewalls having an interior face defining a first interior holding area, a sub-container having a bottom wall and a plurality of sidewalls integrally connected to the bottom wall, the bottom wall of the sub-container and the sidewalls of the sub-container having an interior face defining a second interior holding area, and a lid formed to removably mate with a top portion of the sub-container to enclose the second interior holding area, the lid and the sub-container forming a structure formed to removably mate with a top portion of the main container to enclose the first interior holding area.

Pursuant to some embodiments, container systems and apparatus are provided which include a main container having a bottom wall and a plurality of sidewalls integrally connected to the bottom wall, the bottom wall and sidewalls having an interior face defining a first interior holding area, a sub-container having a bottom wall and a plurality of sidewalls integrally connected to the bottom wall, the bottom wall of the sub-container and the sidewalls of the sub-container having an interior face defining a second interior holding area, and a lid formed to removably mate with either of a top portion of the sub-container to enclose the second interior holding area and a top portion of the main container to enclose the first interior holding area, wherein the bottom wall of the main container is sized to fit within the sub-container and the bottom wall of the sub-container is sized to fit within the main container.

The results are containers which allow contents to be stored in the main container as well as in the sub-container. Further, in some embodiments, the sub-container may collapse when not in use or not needed. In some embodiments, the sub-container may function as both a lid of the main container as well as an expandable container. A number of embodiments will be described herein, each allows improved storage of and access to product within the container system. Embodiments allow improved efficiency, use of space, and access to the contents of the container system.

In some embodiments, one or more of the container systems disclosed herein may be used to conveniently and efficiently store quantities of food product(s) in a well-organized manner, and to facilitate the easy rotation of food product(s) in a manner consistent with "first-in, first-out", or FIFO, while helping improve overall utilization of storage space.

Figure 1:
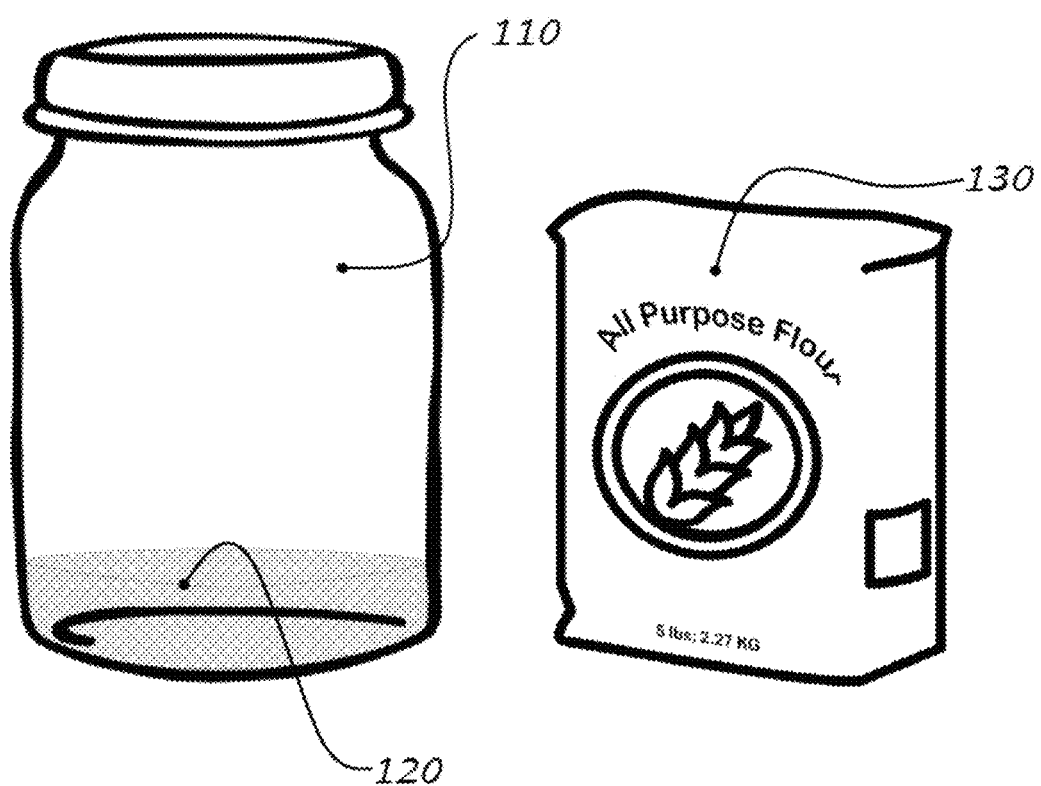
FIG. 1 is a perspective view of a prior art container and product.

Referring first to FIG. 1, an illustrative storage container 110 is shown, where the storage container 110 is mostly empty except for an illustrative small amount of flour 120. Next to the container 110 is an illustrative full 5 pound bag of flour 130.

In the example of FIG. 1, container 110 may be typical of any storage container used by consumers, merchants or other users to store food or other items in a pantry or storage area. Similarly, the quantity of flour 120 in container 110 may be typical of any food or other item stored in a residential pantry or storage area. For convenience and ease of exposition, the term "product" will be used to refer to the contents of the storage container (e.g., such as the flour 120). The bag of flour 130 may be typical of a retail package commercially available for purchase by a consumer for use in a residential or other context, or any generic plastic or paper bag in which a consumer might purchase food items in bulk, whether such food items be purchased either from a brick-and-mortar retail store, or an online retailer.

It is noted that bag 130 does not imply any limits onto products or packages of products that may, in one way or another, be referenced and/or used or associated with an embodiment of a container system herein.

Features of embodiments of the present invention will now be described by first referring to FIGS. 2A, 2B, and 2C which are each an illustrative depiction of a container system 200 pursuant to some embodiments of the present invention.

Figure 2A:
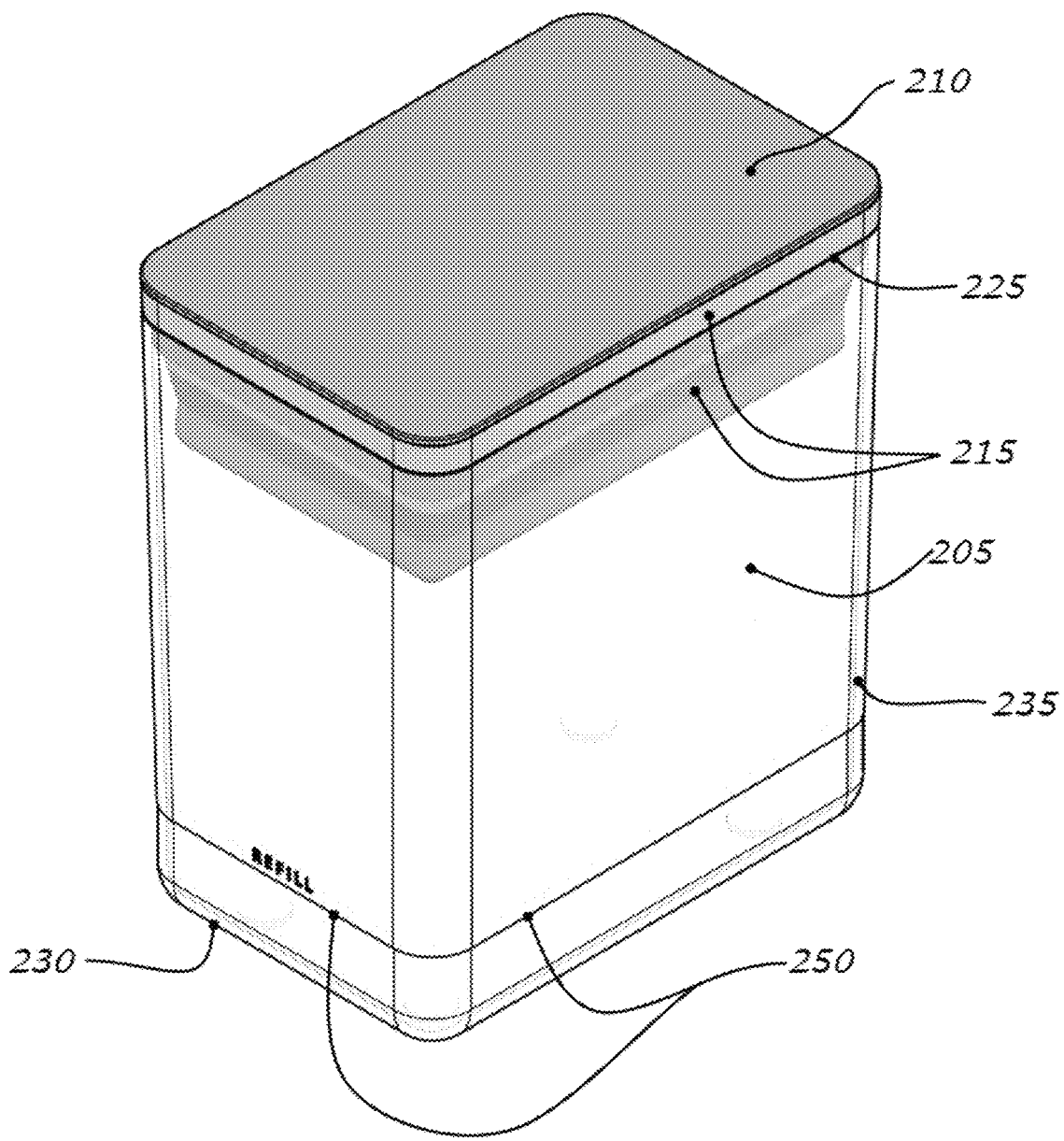
FIGS. 2A-2C are views of a container system pursuant to some embodiments.

FIG. 2A shows the container system 200 in a view showing a closed container. More particularly, the container system 200 includes a main container 205, a lid 210, and a sub-container 215 (shown in an assembled or closed configuration). The main container 205 may generally include a bottom wall 230 and a plurality of sidewalls (e.g., 235) integrally connected to the bottom wall. In some embodiments, an indication such as a printed line or some other indicia may be provided on main container 205 to indicate a "refill volume", as represented by refill line 250. The lid 210 fits on top of the sub-container 215 and the sub-container fits on top of the main container 205 such that the combination of the lid 210 and the sub-container 215 seal or otherwise enclose an interior of the main container 205. Each of the items shown in FIG. 2 (and elsewhere herein) including the main container 205, the sub-container 215 and the lid 210 may be formed of any number of different thermoplastics including but not limited to polycarbonate, acrylic, high-density polypropylene, glass-reinforced nylon. Some items shown in FIG. 2, and in particular, the main container 205 and the lid 210, may be formed of glass, or of stainless steel. Further, pursuant to some embodiments, it may be desirable to form part of the sub-container 215 of a material that is resiliently deformable such as a medium-durometer silicone.

In general, as used herein, the configuration of the lid 210 and the sub-container 215 will be referred to as a "structure". The "structure" need not be a unitary structure, instead, as shown in FIG. 2A, it may be comprised of different components that fit together to form a structure that may be separated from the main container 205 to allow access to the interior of the main container 205.

Figure 2B:
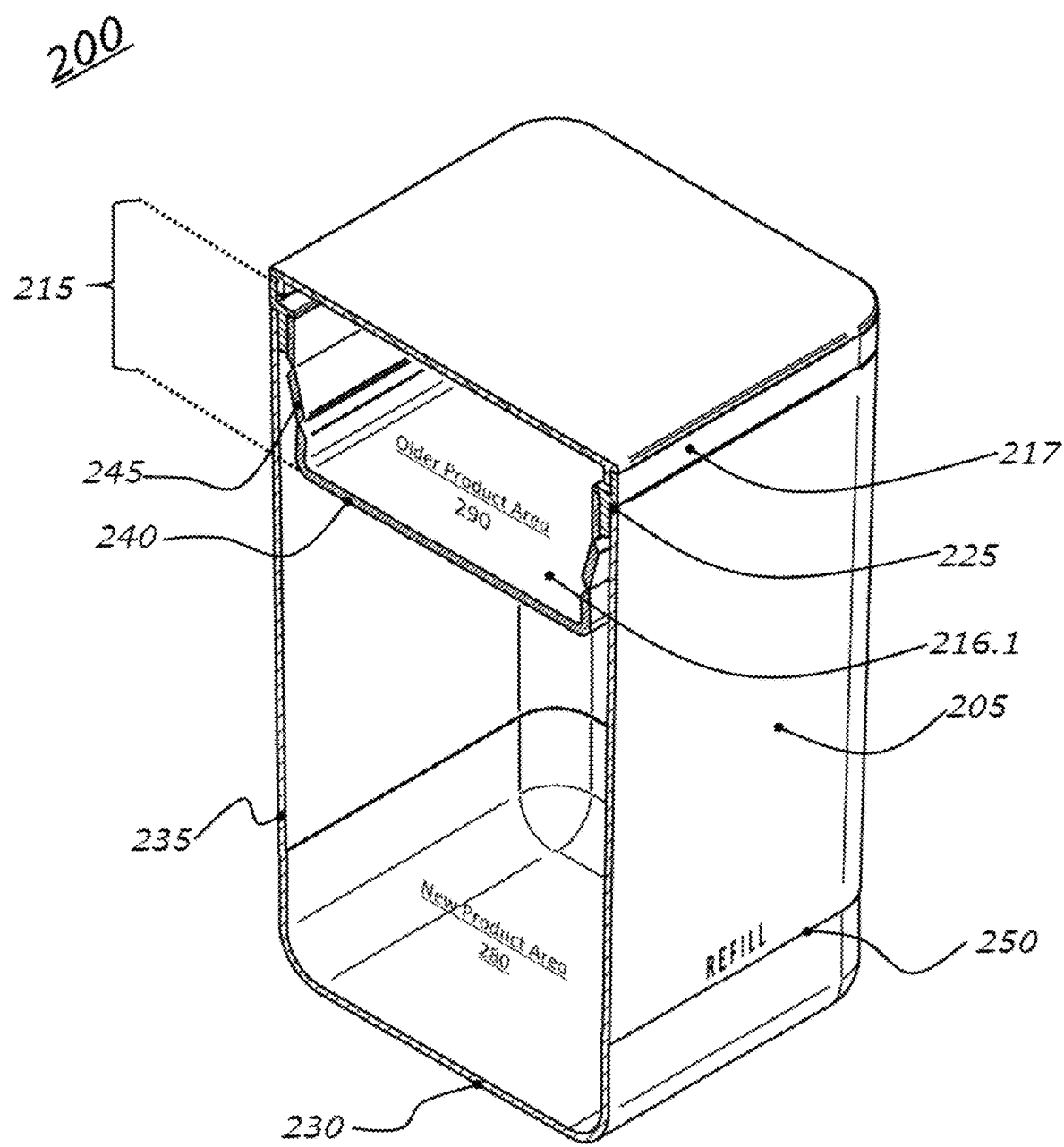

FIG. 2B is a vertical cross section of container system 200. In FIG. 2B it can be seen that in some embodiments the bottom wall 230 and sidewalls 235 of main container 205 have interior faces that cooperate and define an interior holding area 280 of the main container. The main container 205 may also include an upper edge of the side walls 225 which may comprise a surface upon which a collar 217 of the sub-container 215 may be supported. When the collar 217 of the sub-container 215 is positioned on the upper edge of the side walls 225 the sub-container is supported within the interior of the main container 205.

In some embodiments, sub-container 215 may have a bottom wall 240 integrally formed or connected with a plurality of sidewalls (e.g., 245) of the sub-container, where the bottom wall and sidewalls of the sub-container have an interior face defining an interior holding area 290 of the sub-container. The lid 210 fits on a top portion of the sub-container 215 and, when installed, encloses the interior holding area 290 of the sub-container 215, and the collar 217 of the sub-container 215, when installed on a top portion of the main container 205, encloses the interior holding area 280 of the main container 205.

Figure 2C:
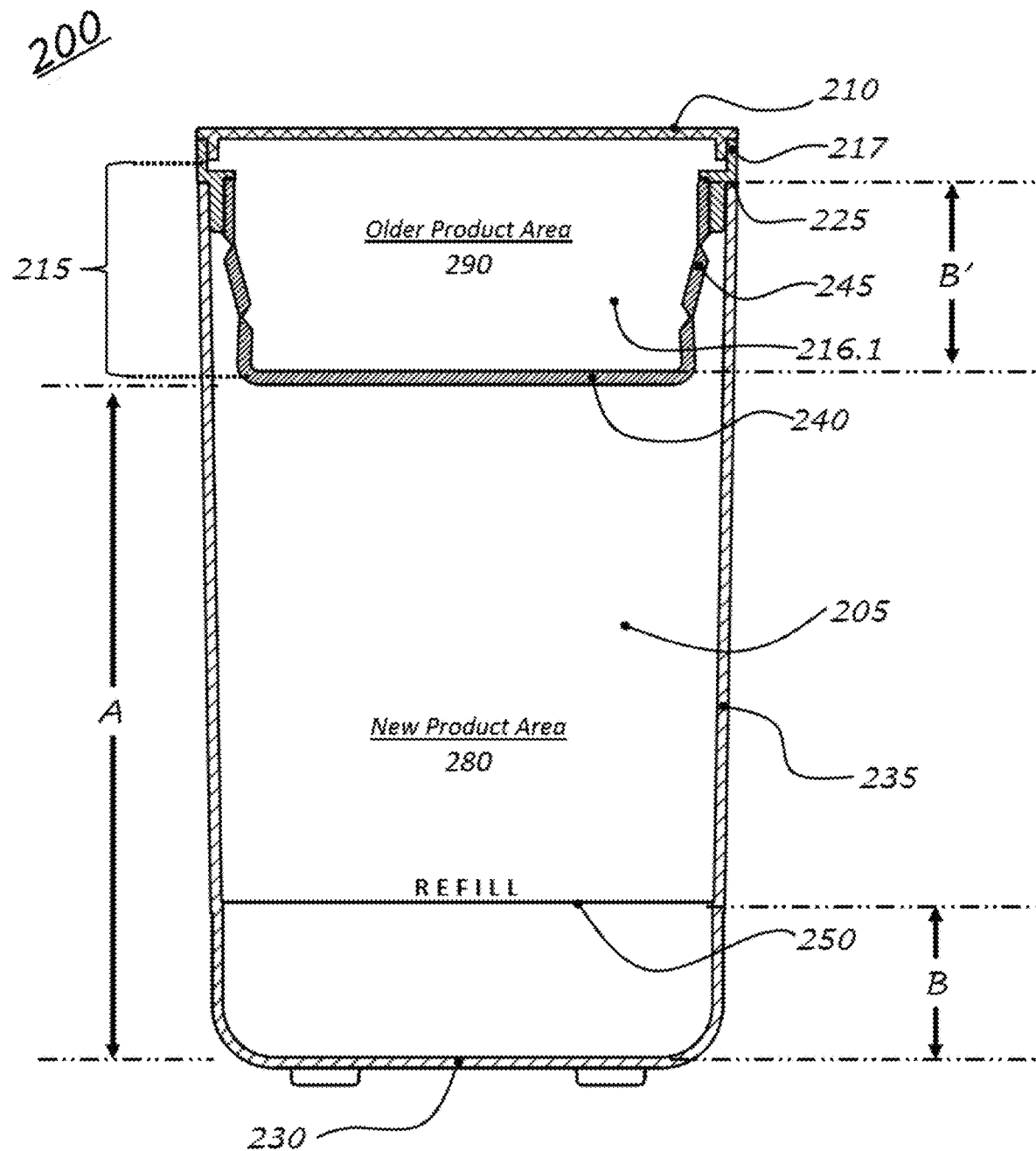

FIG. 2C is a front-view cross section of the container system 200. In some embodiments, lid 210 may operate to provide a relatively air-tight seal between a collar 217 of the sub-container 215 and the lid 210. Similarly, sub-container 215 may operate to provide a relatively air-tight seal at the open end of the main container 205. In some embodiments, lid 210 may also matingly fit directly into the open end of main container 205 to form a relatively air-tight seal between main container 205 and lid 210, allowing for the use of a combination of the main container 205 and the lid 210 independent of the sub-container 215 when desired, for example in a circumstance where the sub-container 215 may have been removed.

In some embodiments, the volume of the interior holding area of the main container 205 below the sub-container 215 (indicated by A in FIG. 2C) may be predetermined and sized to accommodate (at least) a "standard" packaging volume. For example, the volume of this area may be sized to hold a "standard" 5 pound bag of flour, a 1 pound bag of beans, a 14 ounce box of breakfast cereal, a 2.5 ounce container of spice, etc.

In some aspects herein and as shown in FIG. 2C, the volume of the interior holding area 290 of sub-container 215 (indicated by B' in FIG. 2C) may be predetermined and sized to accommodate about 15% to about 50% of a "standard" packaging volume, including in some embodiments which accommodate about 20% to about 30% of a "standard" package volume. For example, the volume or holding capacity 290 of sub-container 215 may be sized to hold about 20% of a "standard" 5 pound bag of flour, a 1 pound bag of beans, a 14 ounce box of breakfast cereal, a 2.5 ounce container of spice, etc.

In some embodiments, the volume in the main container 205 below the refill line 250, (indicated by B in FIG. 2C) may be about the same volume as the volume or holding capacity of sub-container 215. For example, referring to FIG. 2C, the volume or holding capacity of B and B' may be approximately equal to each other.

Figure 3A:
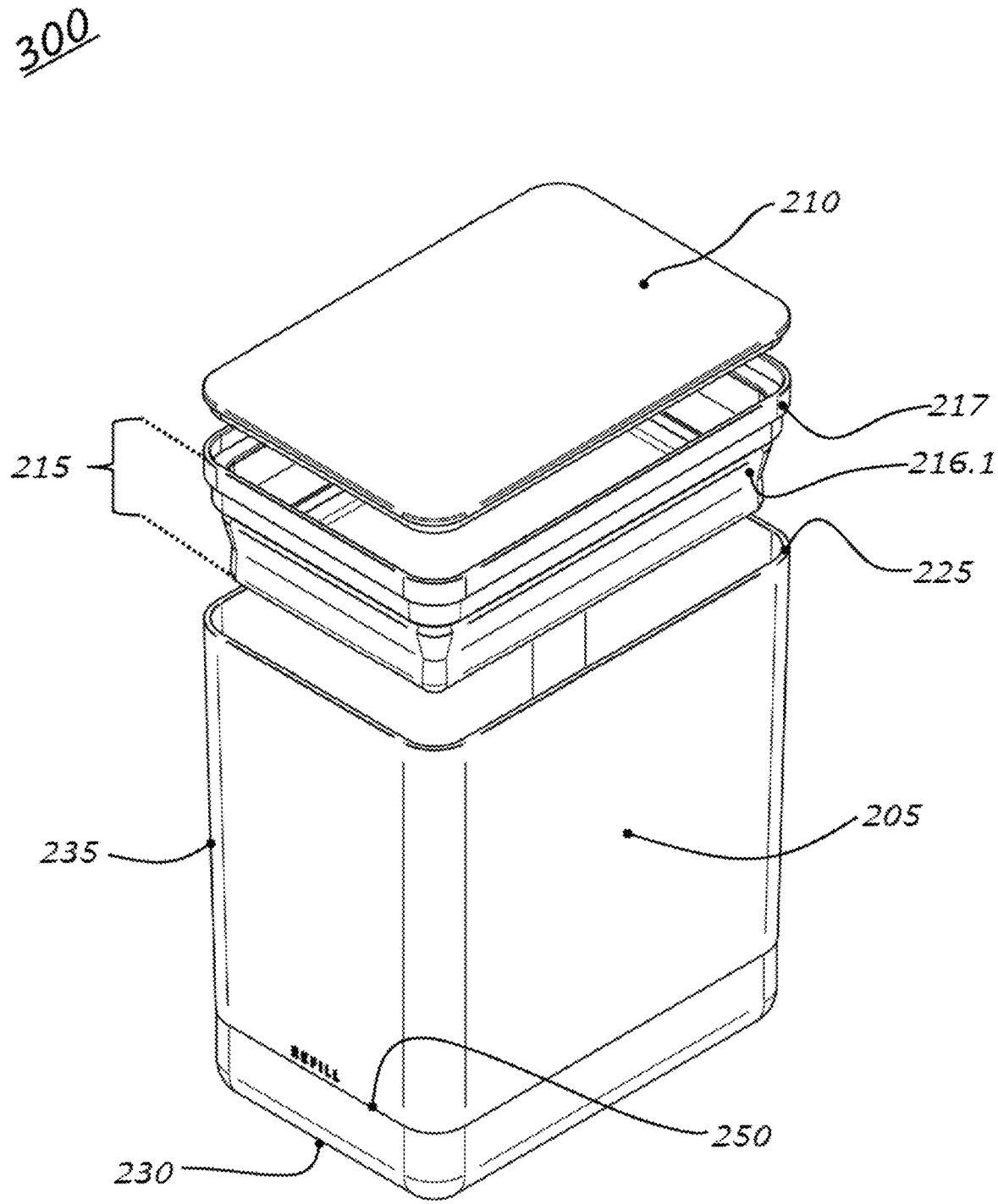
FIGS. 3A and 3B are further views of the container system shown in FIGS. 2A-2C pursuant to some embodiments.
Figure 3B:
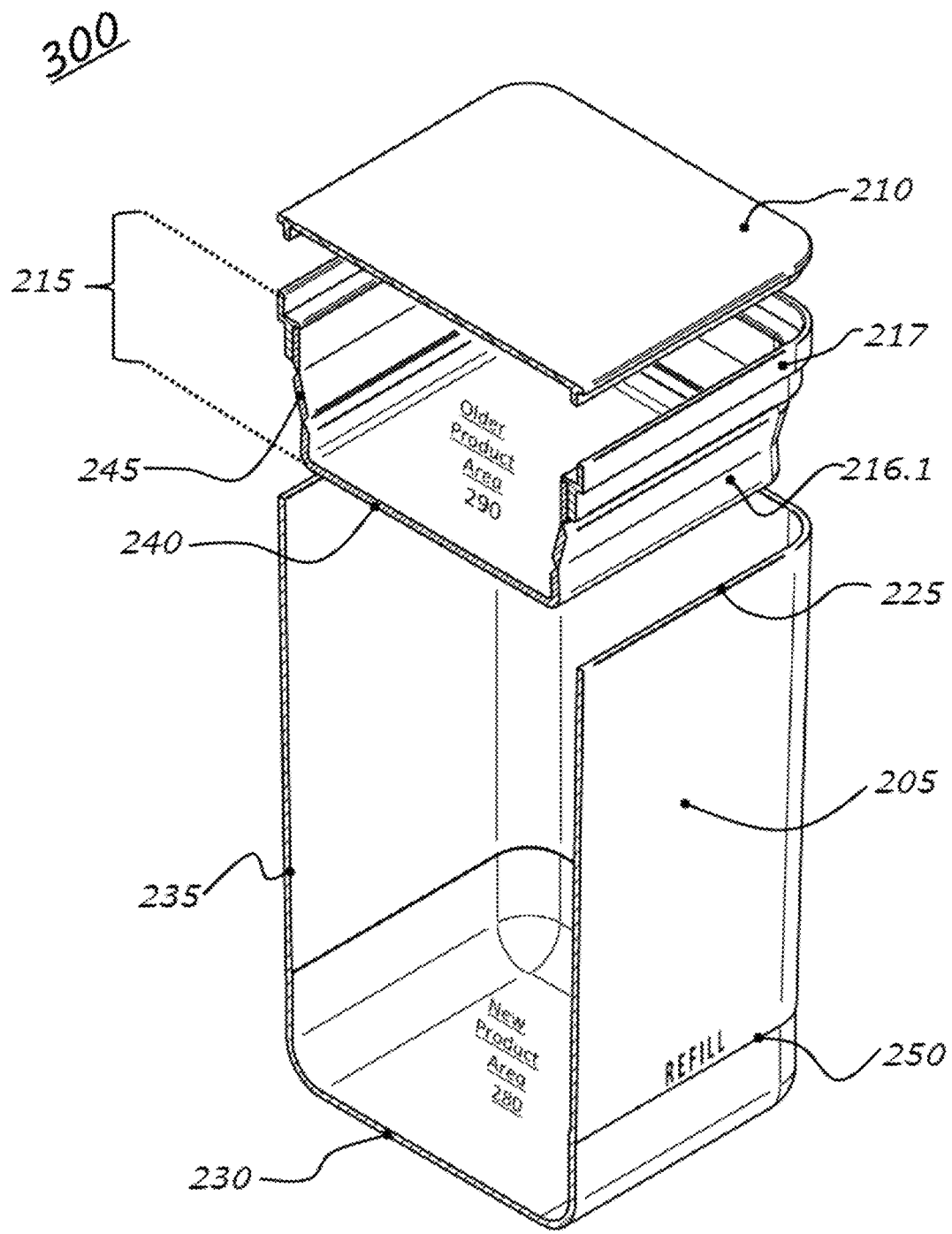

FIGS. 3A and 3B are an illustration of container system 200 where FIGS. 3A and 3B are, respectively, a perspective view and a vertical cross section of container system 200, shown with its components in an "exploded" configuration, according to some embodiments. In FIGS. 3A and 3B, it can be seen that in some embodiments, the lid 210 may be independently removable from the sub-container 215. The sub-container 215 may be independently removable from the main container 205.

Figure 4A:
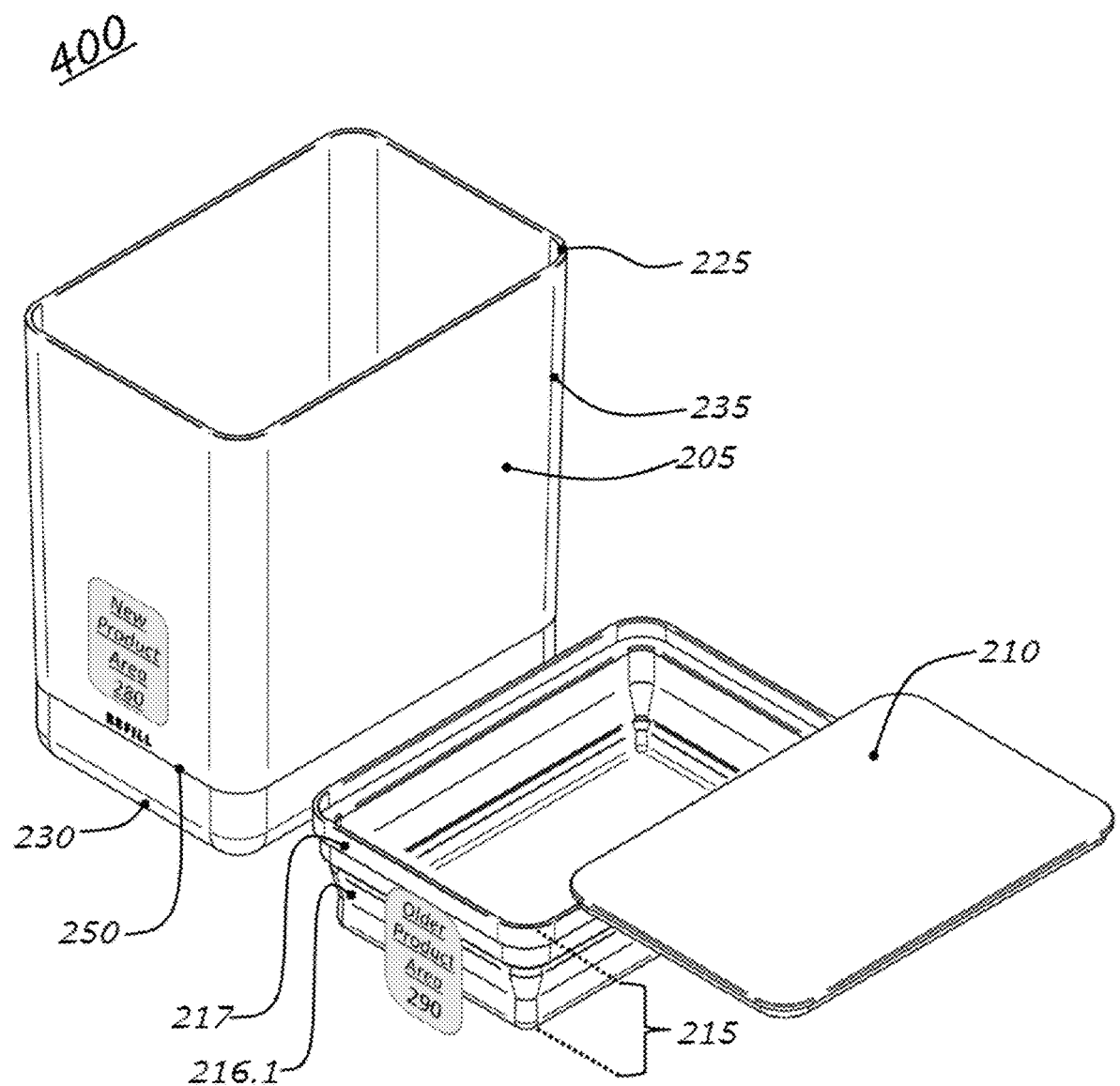
FIGS. 4A and 4B are further views of the container system shown in FIGS. 2A-2C pursuant to some embodiments.
Figure 4B:
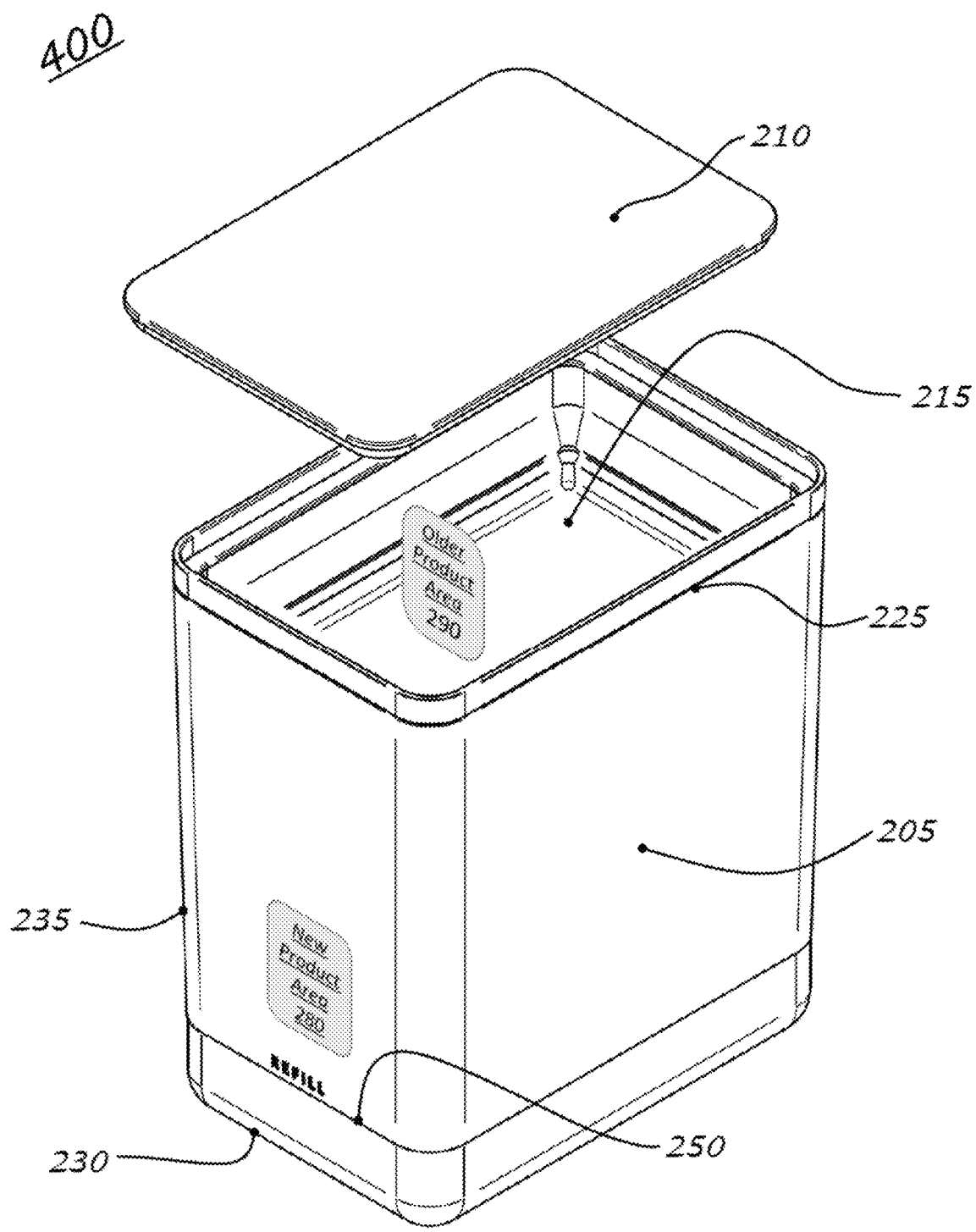

Reference is now made to FIGS. 4A and 4B which are perspective views of container system 200, shown to illustrate a particular use case subject to some embodiments. In FIG. 4A, sub-container 215 is shown as removed from, and placed adjacent to main container 205, and lid 210 is shown as removed from sub-container 215. In this configuration, it would be easy for a consumer to transfer a refill quantity of product from the main container 205 to the sub-container 215, and then fill the main container holding area 280 with new product. For example, the refill quantity of product may be the product that remains in the main container 205 under the refill line 250.

In FIG. 4B, the sub-container 215 (which may contain the older refill quantity of product in its holding area 290) is shown as having been replaced on the top portion of the main container 205 (which may have been filled with new product in its holding area 280). In this configuration, it can be seen that a consumer is able to (a) store older product and new product together in the container system 200, while maintaining separation of the older and new product; and (b) conveniently access, dispense and use older product contained in the sub-container 215.

Figure 5A:
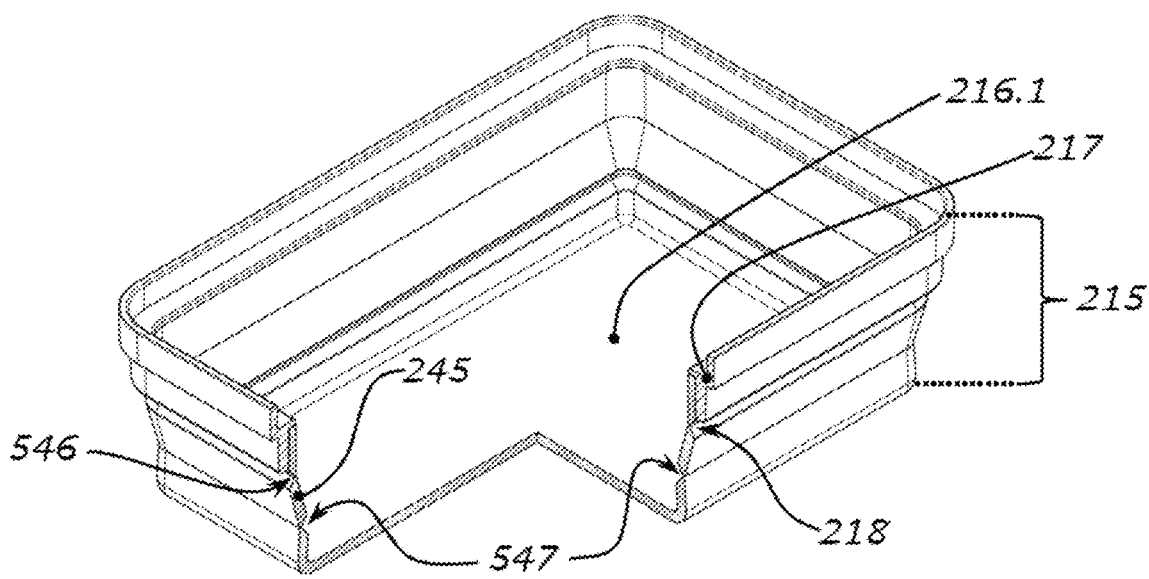
FIGS. 5A and 5B are further views of portions of the container system shown in in FIGS. 2A-2C pursuant to some embodiments.
Figure 5A:
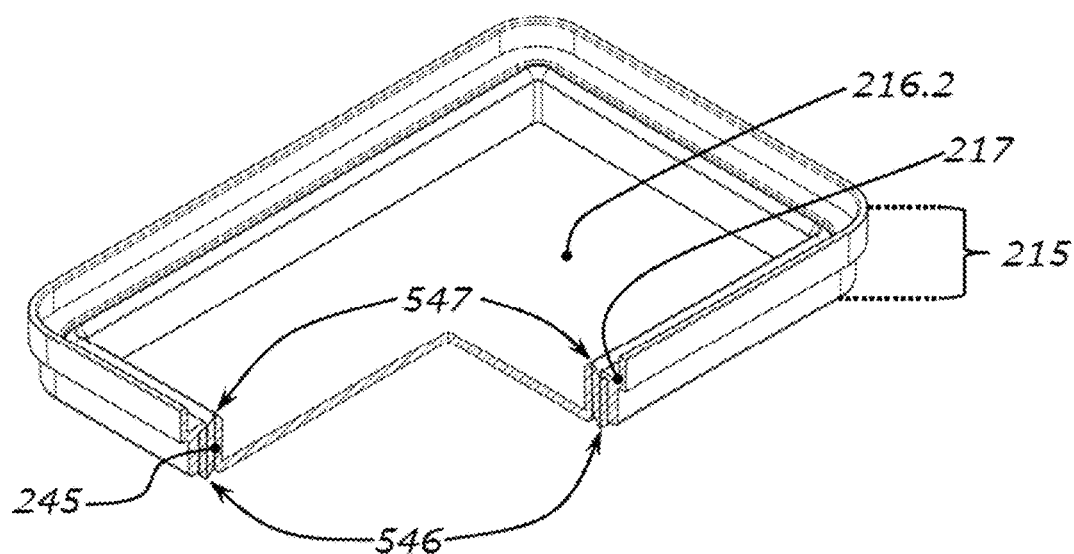
Figure 5B:
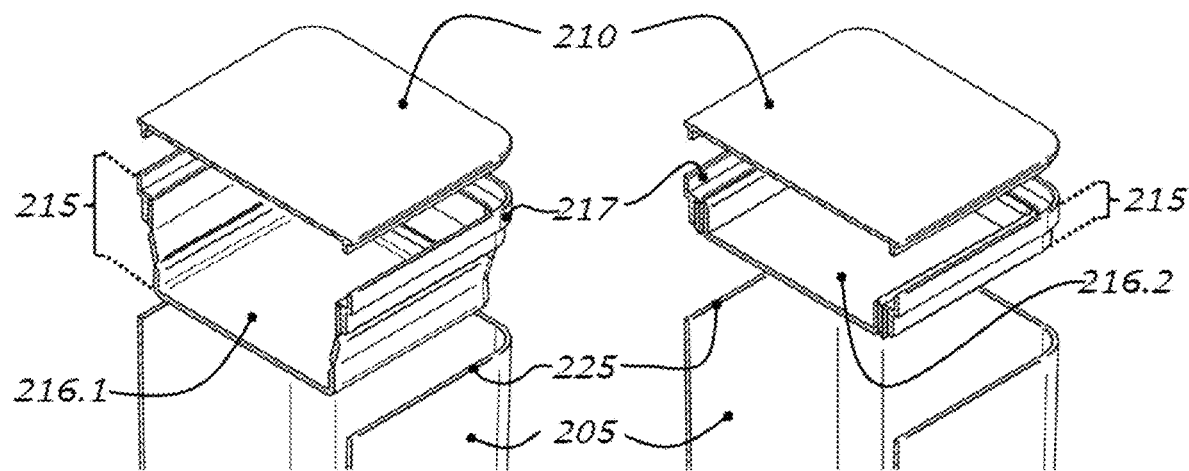

Reference is now made to FIGS. 5A and 5B which are further views of the sub-container 215 of the container system. More specifically, FIGS. 5A and 5B show an embodiment of the sub-container 215 that may be collapsed and extended to increase or decrease the size of the interior of the sub-container 215.

FIG. 5A illustrates the side wall 245 of sub-container 215, in which two sections have reductions in side-wall thickness, one on the upper third of the outer face 546 of the side wall 245, and the second on the lower third of the inner face 547 of side wall 245. In an embodiment where the collapsible vessel 216.1 and 216.2 is constructed of a moderately deformable material, such as medium-durometer food-grade silicon, these reductions in side wall thickness 546 and 547 act as a kind of hinge in the side wall, where, when moderate pressure is applied to the underside of the expanded collapsible vessel 216.1, the collapsible vessel folds into itself, and comes to rest as the collapsed vessel 216.2. In some embodiments, side wall reduction 546 largely remains in-place, forming an outward/downward facing "hinge" that allows the inner face of the side wall 245 to fold in onto itself. Concurrently, side wall reduction 547 forms an inward/upward facing "hinge" that moves upward as the side wall 245 folds in on itself, ultimately coming to rest in the collapsed position of vessel 216.2.

FIG. 5B is an illustration of the sub-container 215, with collapsible vessel 216 in two different positions: (i) the vessel expanded 216.1 on the left, configured as it may be when product is stored therein; and (ii) the vessel collapsed, 216.2, on the right, configured as it may be when no product is stored therein. Also in this view, the sub-container 215 is shown in spatial relation to the main container 205 and lid 210. In this view, it can be seen that when the vessel 216 is collapsed 216.2, the overall height of the sub-container 215 is reduced significantly relative to its expanded position 216.1. Further, in this collapsed position 216.2, the sub-container 215 is essentially "stowed", where the sub-container 215 may be stored entirely within container system 200, obviating the need to store the sub-container 215 elsewhere when not in use, and essentially eliminating the risk of a consumer inadvertently misplacing the sub-container 215.

Figure 6A:
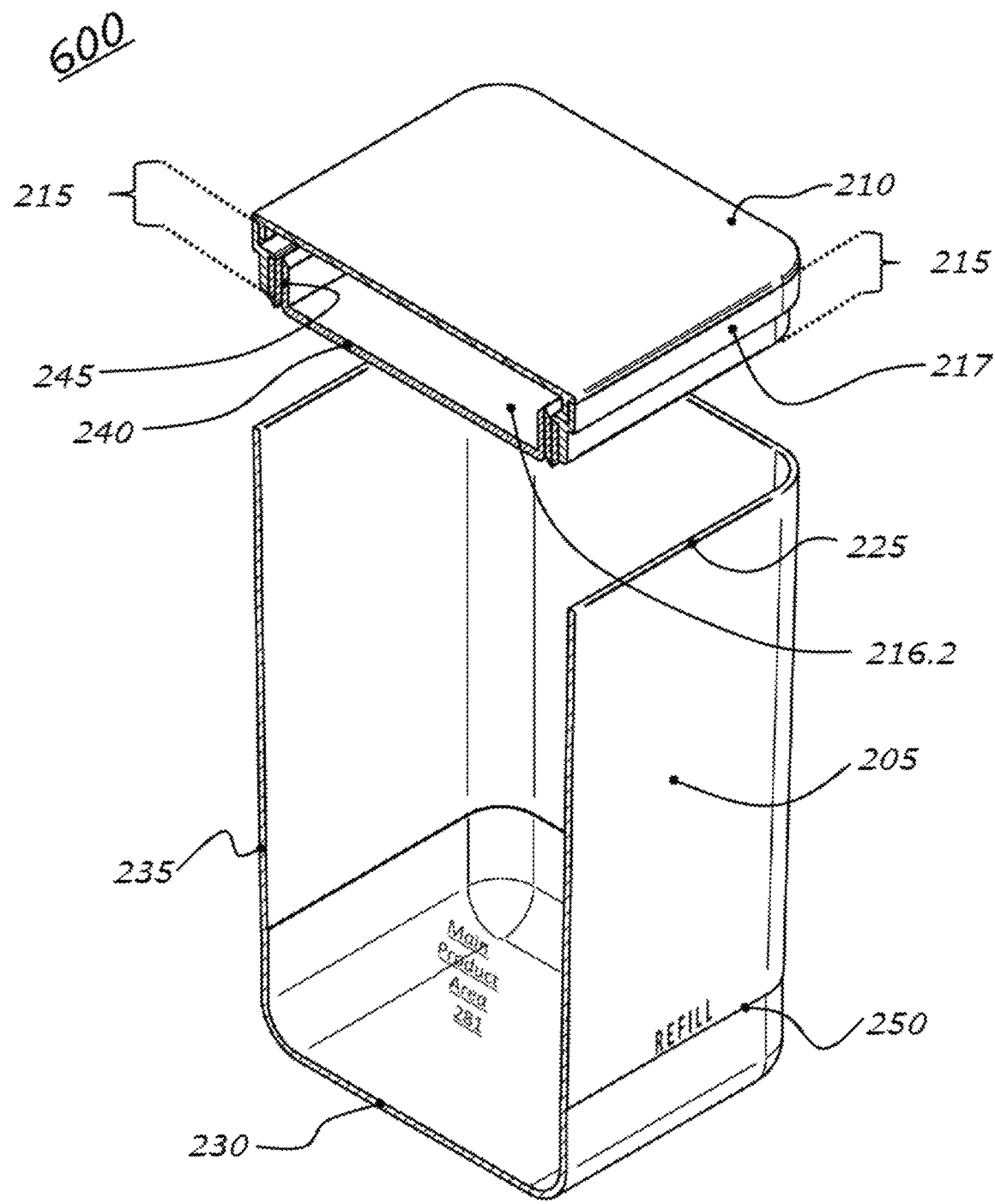
FIGS. 6A and 6B are views of the container system shown in in FIGS. 2A-2C pursuant to some embodiments.
Figure 6B:
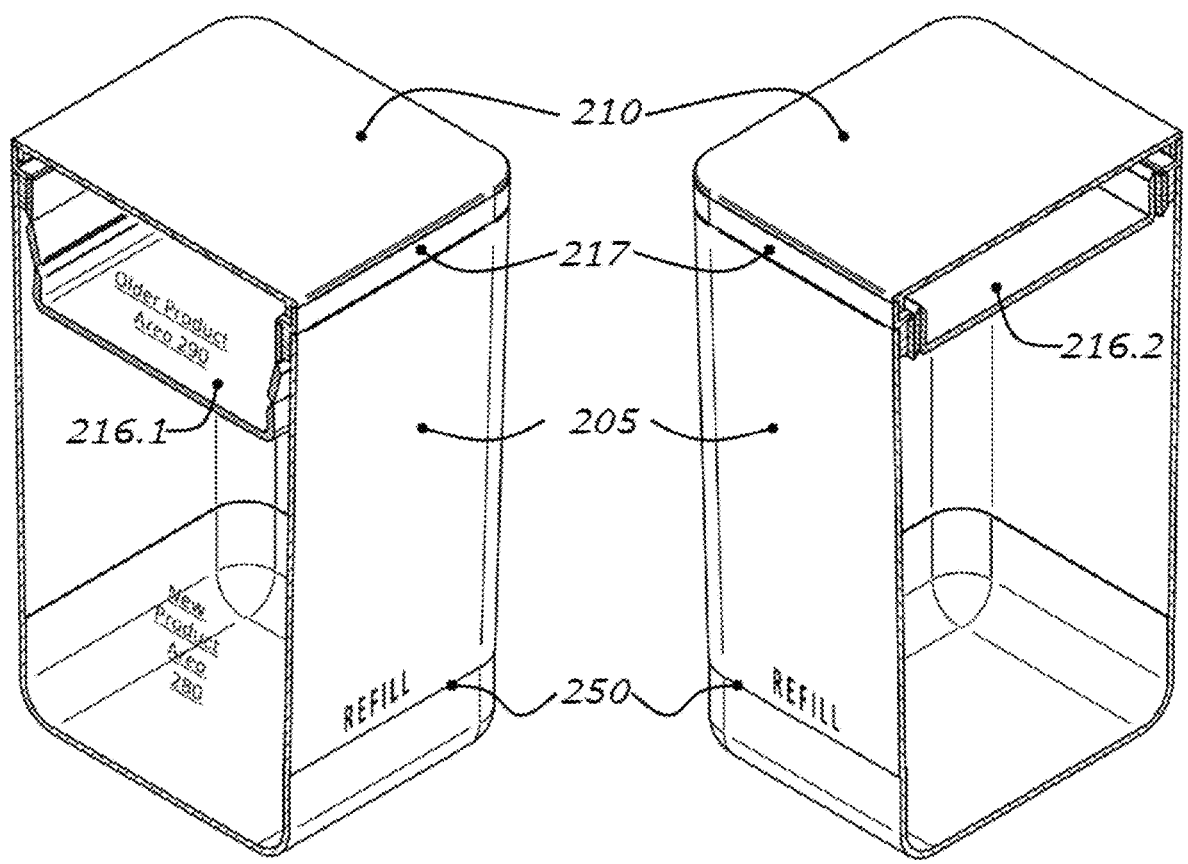

FIGS. 6A and 6B are illustrations of the container system 200 in vertical cross section, according to some embodiments. FIG. 6A is an illustration of the sub-container 215 removed from main container 205 while still being matingly adjoined to the lid 210. In this view, it can be seen that sub-container 215 and lid 210 may be removable as a single unit from the main container 205, enabling a consumer to conveniently access, dispense and use product contained in main container 205. Thus, according to some embodiments, the collapsed sub-container 215 may be stored entirely within main container 205 without impeding the typical use of the combination of the main container 205 and lid 210.

FIG. 6B is an illustration of the container system 200, showing the sub-container 215 with its vessel expanded 216.1 on the left, and with its vessel collapsed 216.2 on the right, according to some embodiments. Here it can be seen how this one container system 200 may be selectively configured as desired by a consumer to store older and new product in a single container system 200, while maintaining separation between the older and new product, while allowing for the easy and convenient access, dispensing, and use of such food product in a manner consistent with FIFO. Further, it can be seen that the overall height of container system 200 is the same whether sub-container 215 is in its expanded position 216.1 or in its collapsed or stowed position 216.2, which is beneficial for use cases when multiple container systems 200 are stored adjacent to or alongside one another.

FIGS. 7A, 7B, 7C, and 7D are illustrations of a container system 700 which is similar to container system 200, except that container system 700 is shown, according to some embodiments, as having a horizontal cross section that is substantially circular, whereas container system 200 is shown as having a horizontal cross section that is substantially rectangular.

Figure 7A:
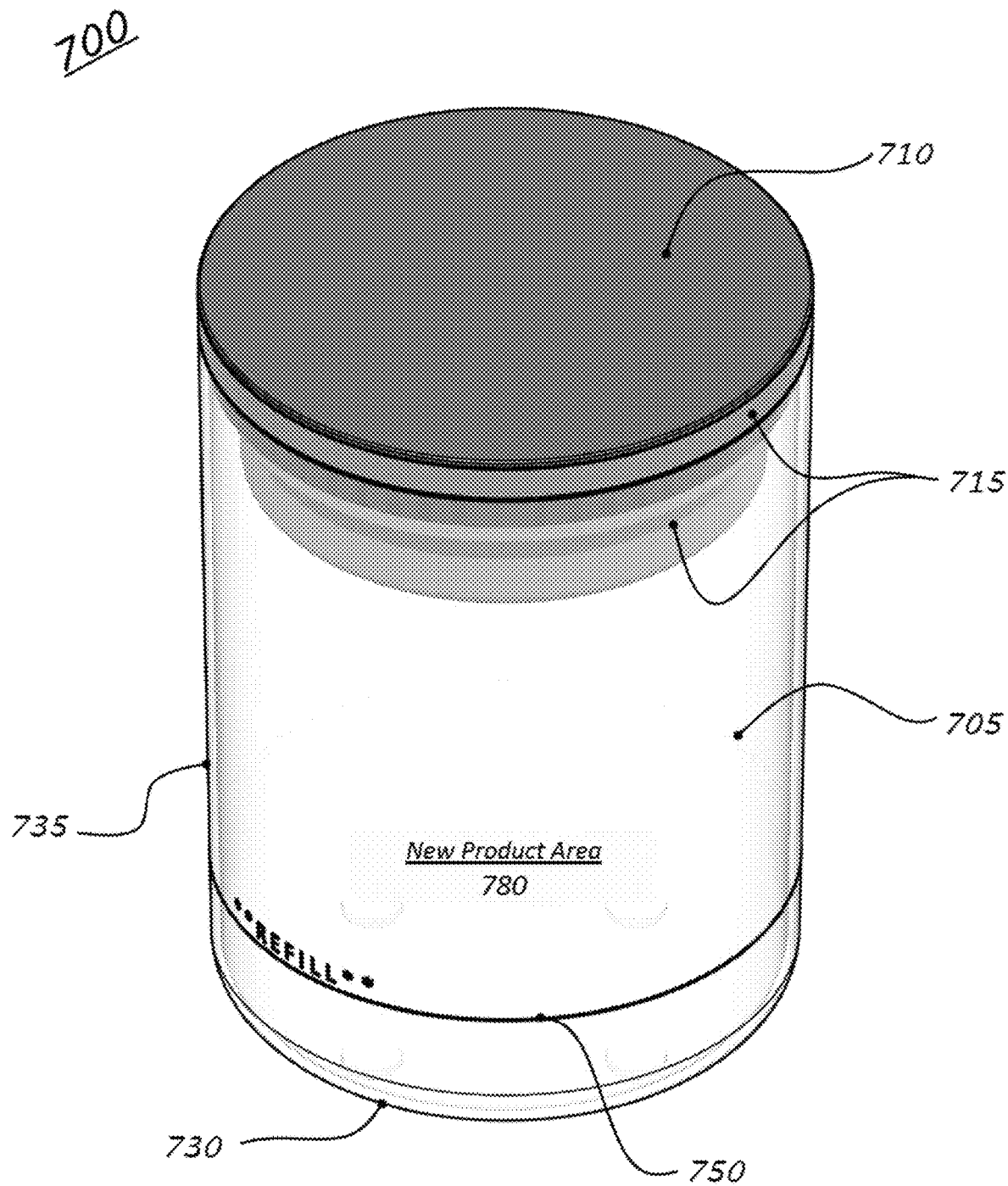
FIGS. 7A-7D are views of a container system pursuant to some embodiments.
Figure 7B:
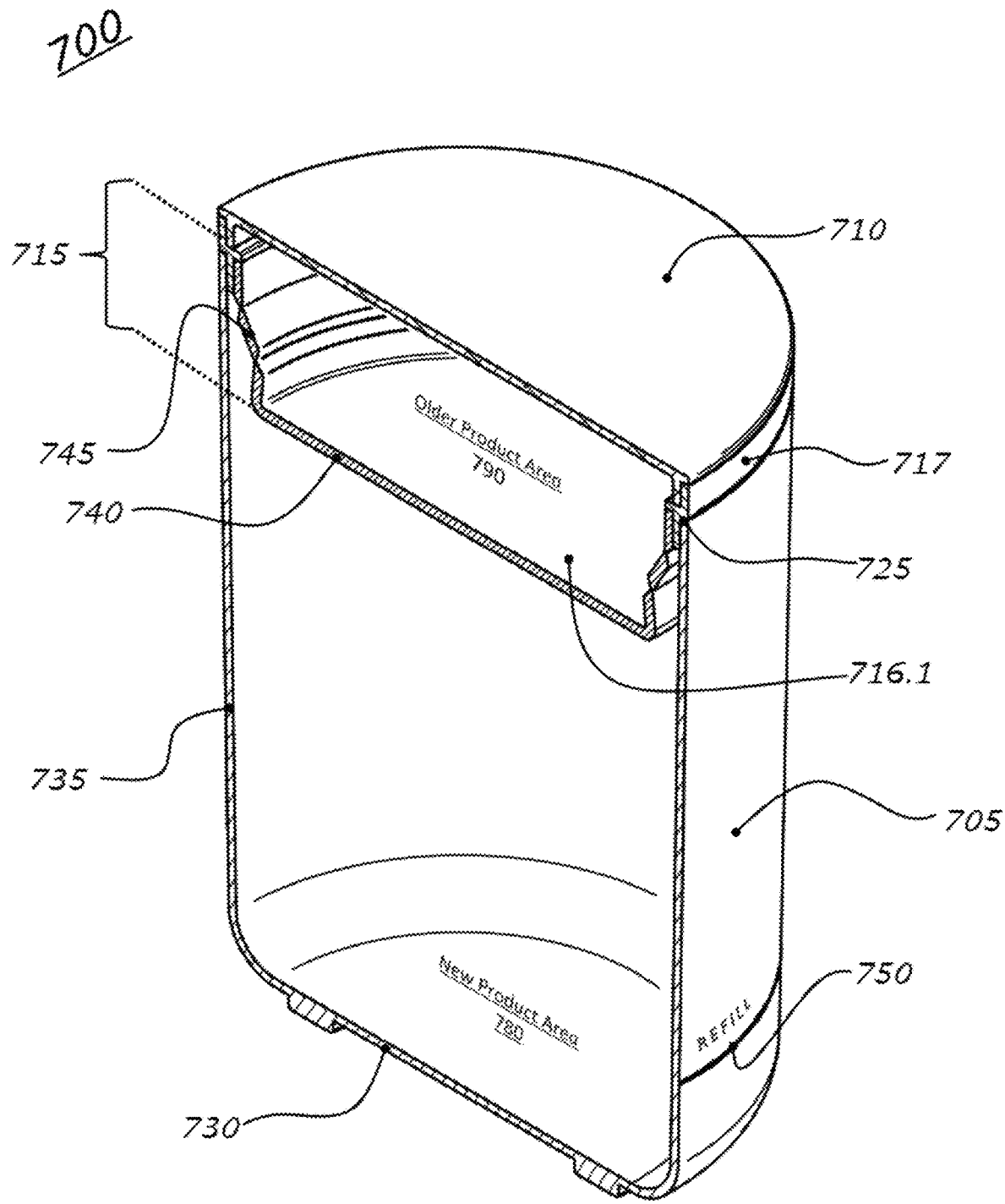

FIGS. 7A and 7B are illustrations of the container system 700 in a perspective view and a vertical cross section, respectively. FIG. 7A illustrates the key parts of container system 700 including main container 705, sub-container 715, and lid 710. Main container 700 may generally include a bottom wall 730 and a sidewall (e.g., 735) integrally connected to the bottom wall. In some embodiments, an indication such as a printed line or some other indicia may be provided on main container 705 to indicate a "refill volume", as represented by refill line 750.

FIG. 7B is a vertical cross section of container system 700. In FIG. 7B, it can be seen that, in some aspects, the bottom wall 730 and sidewall 735 of main container 705 have interior faces that cooperate and define an interior holding area 780 of the main container.

Main container 705 may also include an upper edge of the sidewall 725 which may comprise a surface upon which sub-container collar 717 may be supported, thus supporting sub-container 715 in its entirety.

In some embodiments, sub-container 715 may be comprised of a collapsible vessel, shown here in its expanded configuration 716.1, and where collapsible vessel 716.1 is affixed to a collar 717. Sub-container 715 may have a bottom wall 740 integrally connected with a plurality of sidewalls (e.g., 745) of the sub-container, where the bottom wall and sidewalls of the sub-container have interior faces which, together, define an interior holding area 790 of the sub-container 715. Thus, container system 700 may be used by a consumer to conveniently store older and newer product separately from one another in a single container system.

Figure 7C:
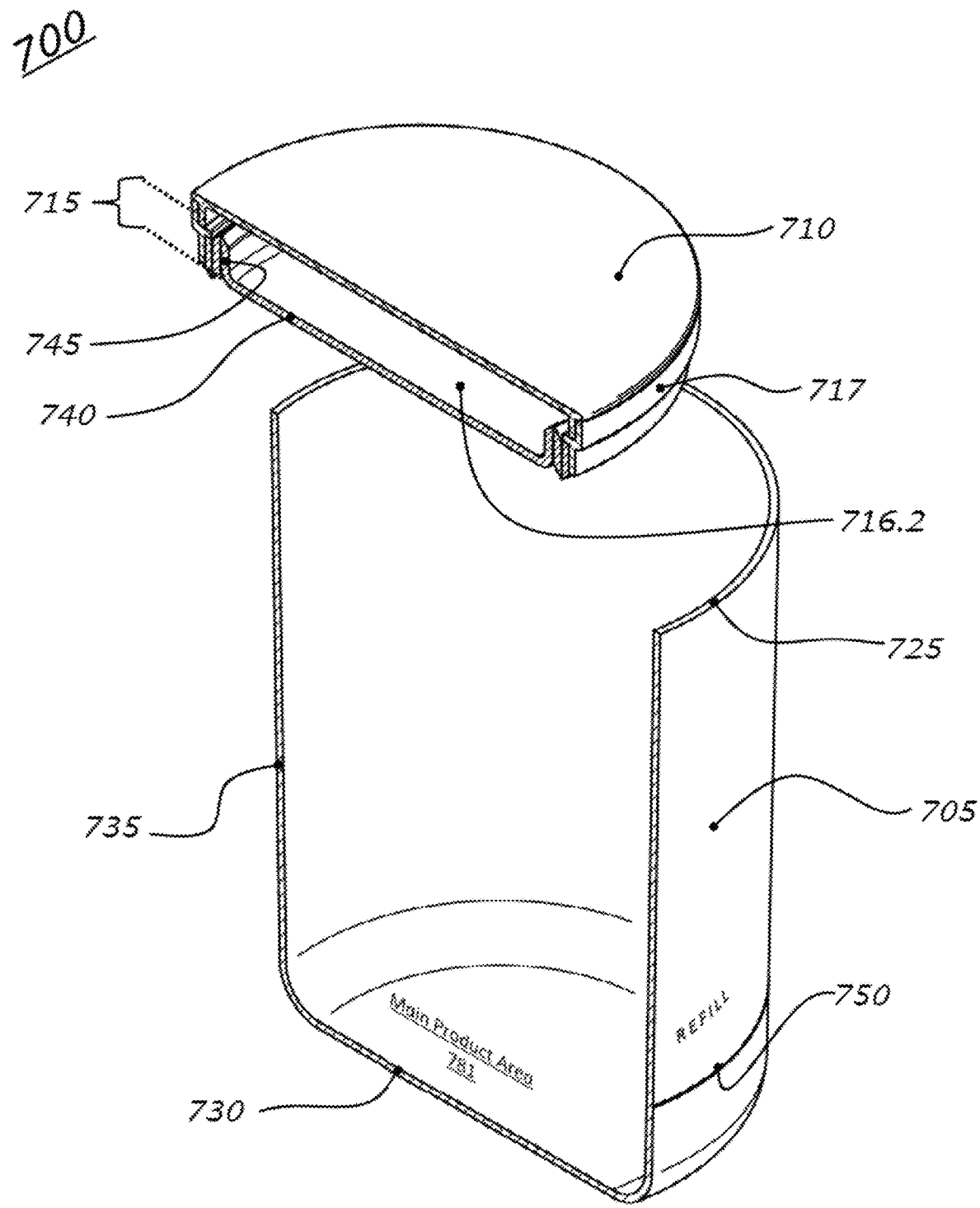

FIG. 7C is an illustration of container system 700 where the sub-container 715 removed from the main container 705 while still being matingly adjoined to the lid 710. In this view, it can be seen that the sub-container 715 and lid 710 may be removable as a single unit from the main container 705, enabling a consumer to conveniently access, dispense and use product contained in main container 705. Thus, according to some embodiments, the collapsed sub-container 715 may be stored entirely within the main container 705 without impeding the typical use of the combination of the main container 705 and lid 710.

Figure 7D:
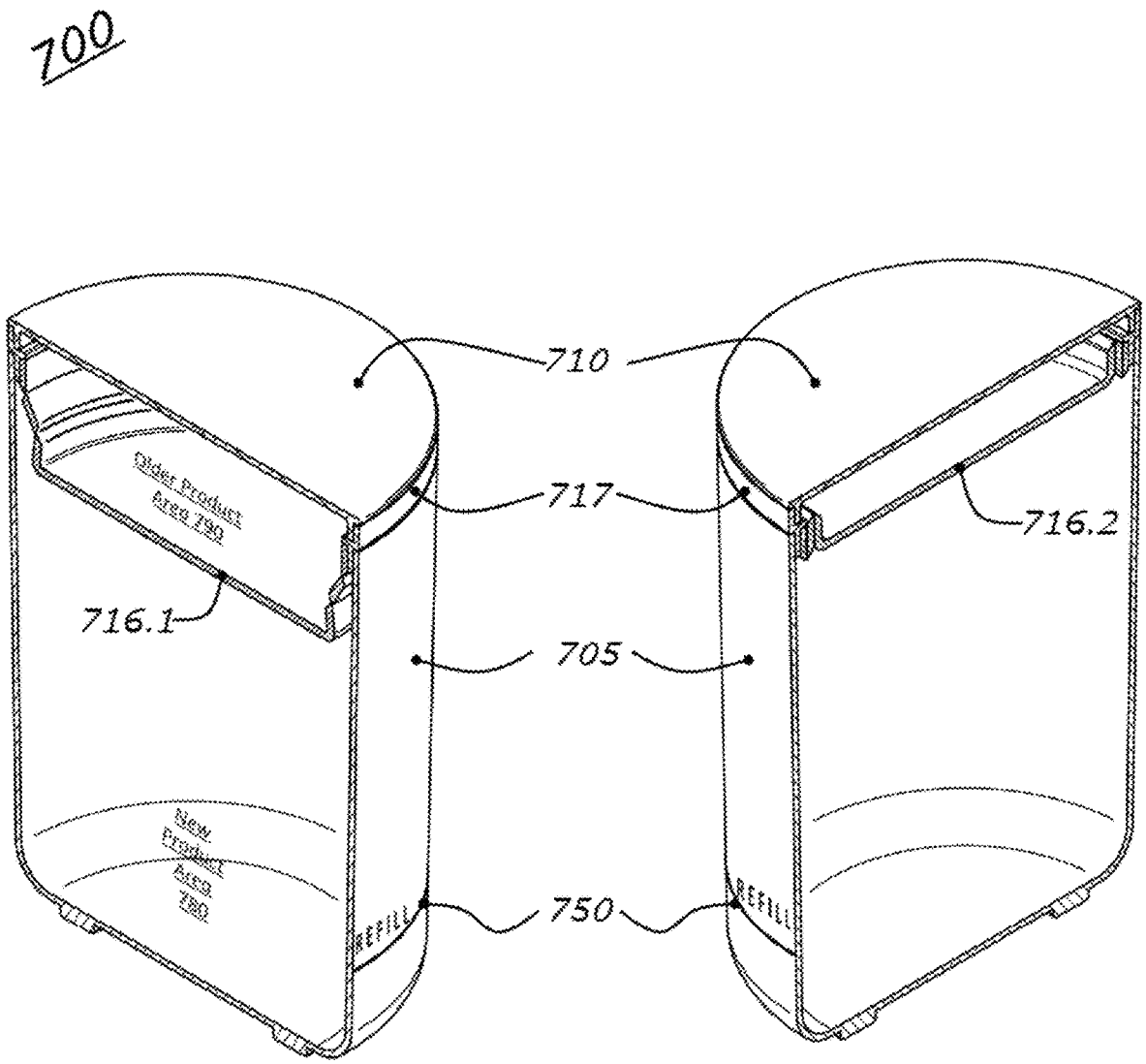

FIG. 7D is an illustration of a container system 700, showing a sub-container 715 with its vessel expanded 716.1 on the left, and with its vessel collapsed 716.2 on the right, according to some embodiments. Here it can be seen how this one container system 700 may be selectively configured as desired by a consumer to store older and new product separately to one another, but in a single container system, while allowing for the easy and convenient access, dispensing, and use of such food product in a manner consistent with FIFO.

FIG. 8A through 8H inclusive are views of a container system 800 having a sub-container that is not collapsible.

Figure 8A:
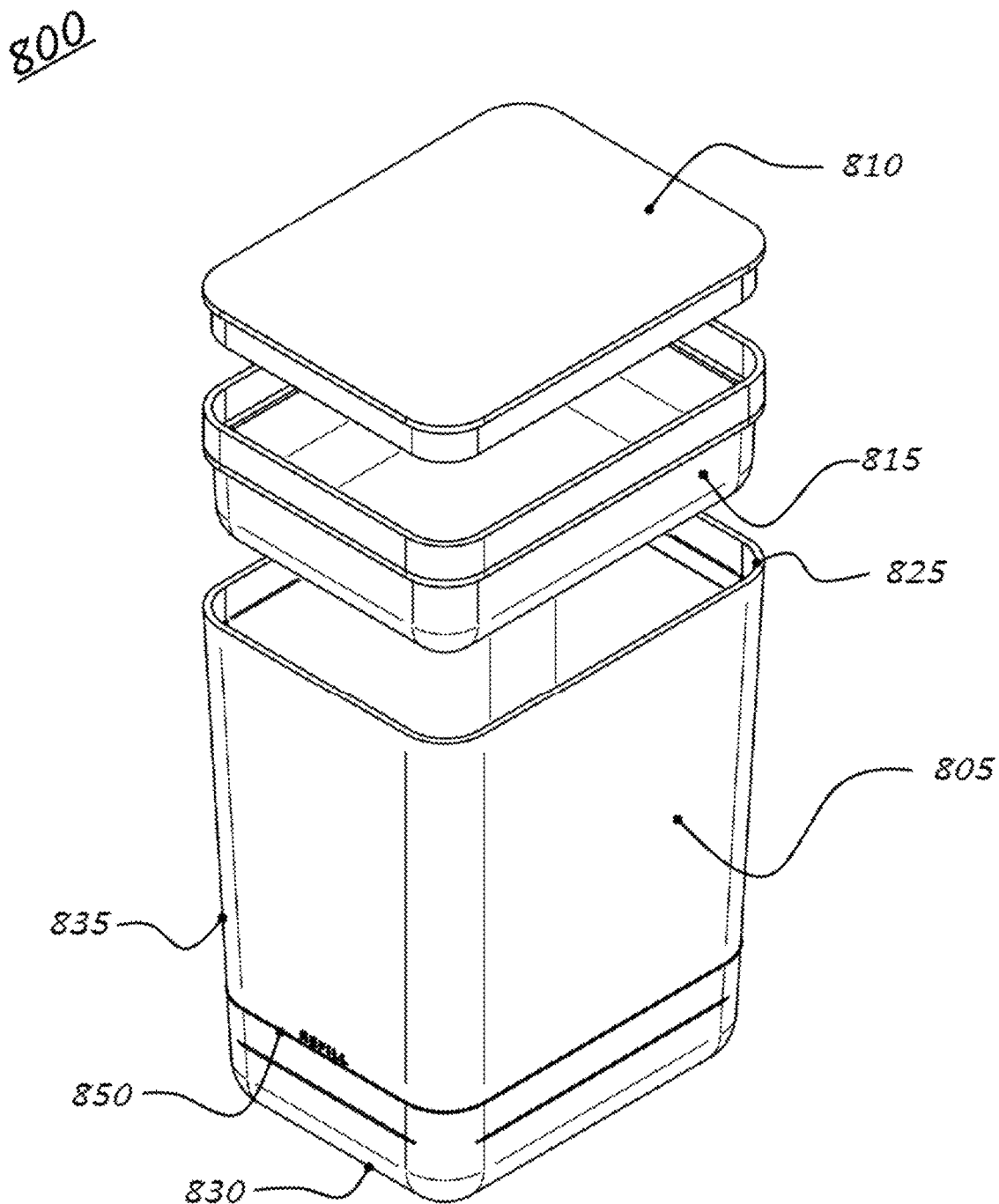
FIGS. 8A-8H are views of a container system pursuant to some embodiments.

As shown in FIG. 8A, a perspective view, container system 800 includes a main container 805, a lid, 810, and a sub-container 815. Main container 805 may generally include a bottom wall 830 and a plurality of sidewalls (e.g., 835) integrally connected to the bottom wall. In some embodiments, an indication such as a printed line or some other indicia may be provided on main container 805 to indicate a "refill volume", as represented by refill line 850.

Figure 8B:
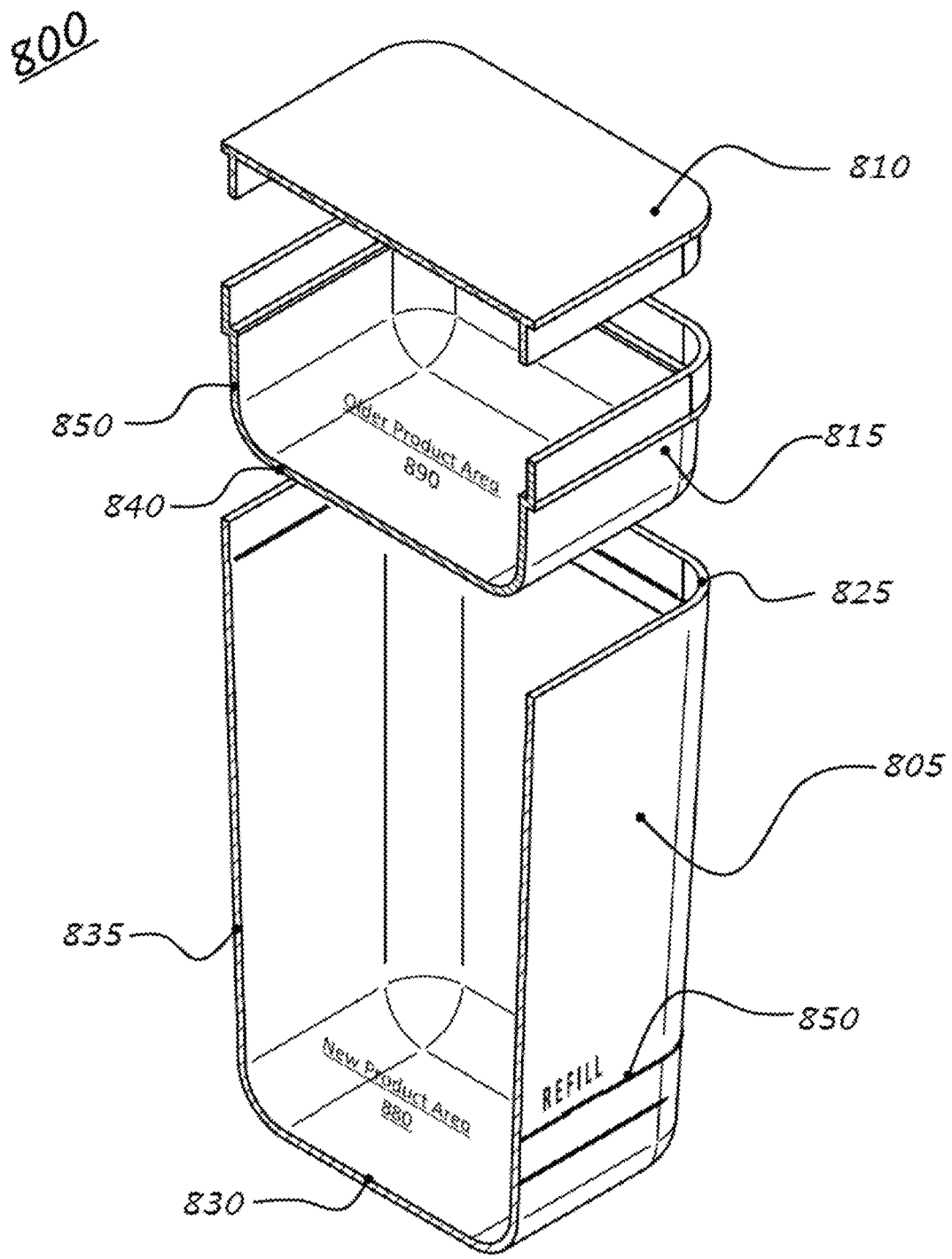

FIG. 8B is a vertical cross section of container system 800. In FIG. 8B, it can be seen that, in some aspects, the bottom wall 830 and sidewalls 835 of main container 805 have interior faces that cooperate and define an interior holding area 880 of the main container 805. The main container 805 may also include an upper edge of the side walls 825 which may comprise a surface upon which sub-container 815 may be supported.

In some embodiments, sub-container 815 may have a bottom wall 840 integrally connected with a plurality of sidewalls (e.g., 845) of the sub-container, where the bottom wall and sidewalls of the sub-container have an interior face defining an interior holding area 890 of the sub-container.

Figure 8C:
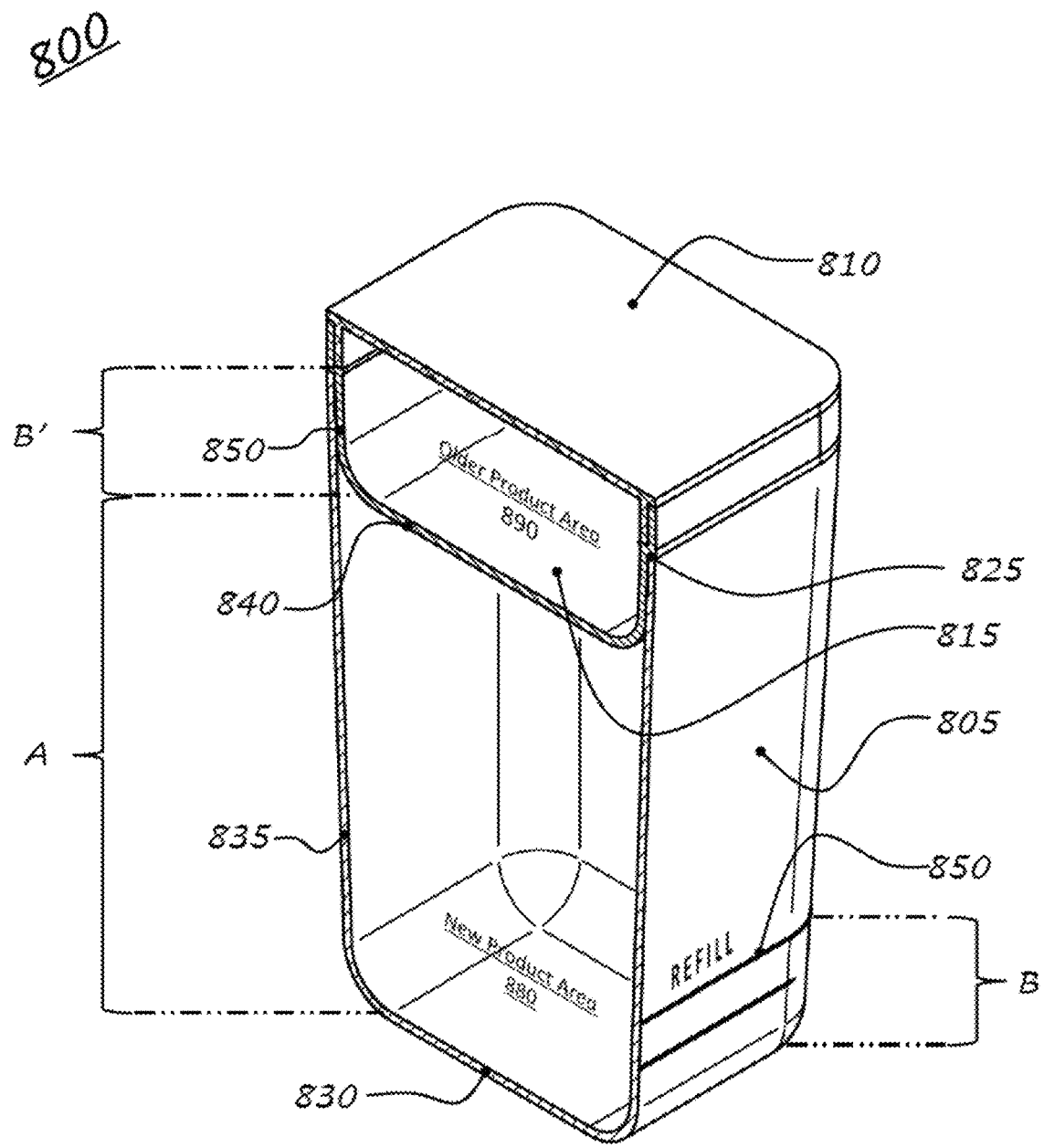

FIG. 8C is a vertical cross section of container system 800. In some embodiments, lid 810 may operate to provide a relatively air-tight seal between the sub-container 815, and lid 810; similarly, sub-container 815 may operate to provide a relatively air-tight seal at the open end of the main container 805. In some embodiments, lid 810 may also matingly fit directly into the open end of main container 805 to form a relatively air-tight seal between main container 805 and lid 810, allowing for the use of a combination of the main container 805 and the lid 810 independent of the sub-container 815 when desired, for example in a circumstance where the sub-container 815 may have been removed.

In some embodiments herein, the volume of the interior holding area of main container 805 below sub-container 815 (indicated by A in FIG. 8C) may be predetermined and sized to accommodate (at least) a "standard" packaging volume. For example, the volume of this area may be sized to hold a "standard" 5 pound bag of flour, a 1 pound bag of beans, a 14 ounce box of breakfast cereal, a 2.5 ounce container of spice, etc.

In some aspects herein and as represented in FIG. 8C, the volume of the interior holding area 890 of sub-container 815 (indicated by B' in FIG. 8C) may be predetermined and sized to accommodate about 15% to about 50% of a "standard" packaging volume, including in some embodiments which accommodate about 20% to about 30% of a "standard" package volume. For example, the volume or holding capacity 890 of sub-container 815 may be sized to hold about 20% of a "standard" 5 pound bag of flour, a 1 pound bag of beans, a 14 ounce box of breakfast cereal, a 2.5 ounce container of spice, etc.

In some embodiments, the volume in the main container 805 below the refill line 850, (indicated by B in FIG. 8C) may be about the same volume as the volume or holding capacity of sub-container 815. For example, referring to FIG. 8C, the volume or holding capacity of B and B' may be approximately equal to each other.

Figure 8D:
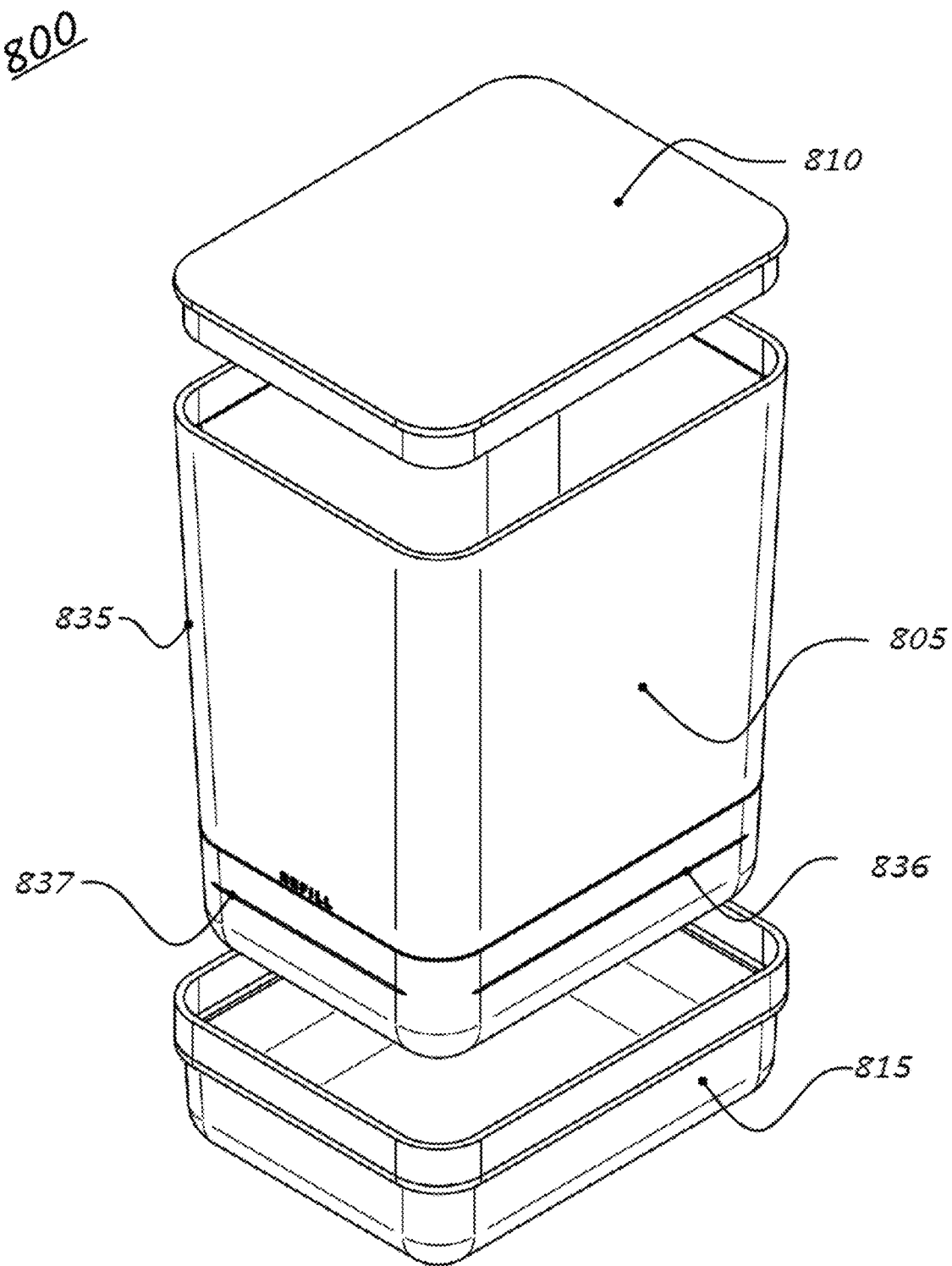

FIG. 8D is a perspective view of container system 800, where sub-container 815 is positioned below sub-container 805, and showing container couplings 836 and 837 on the outer face of main container side wall 835.

Figure 8E:
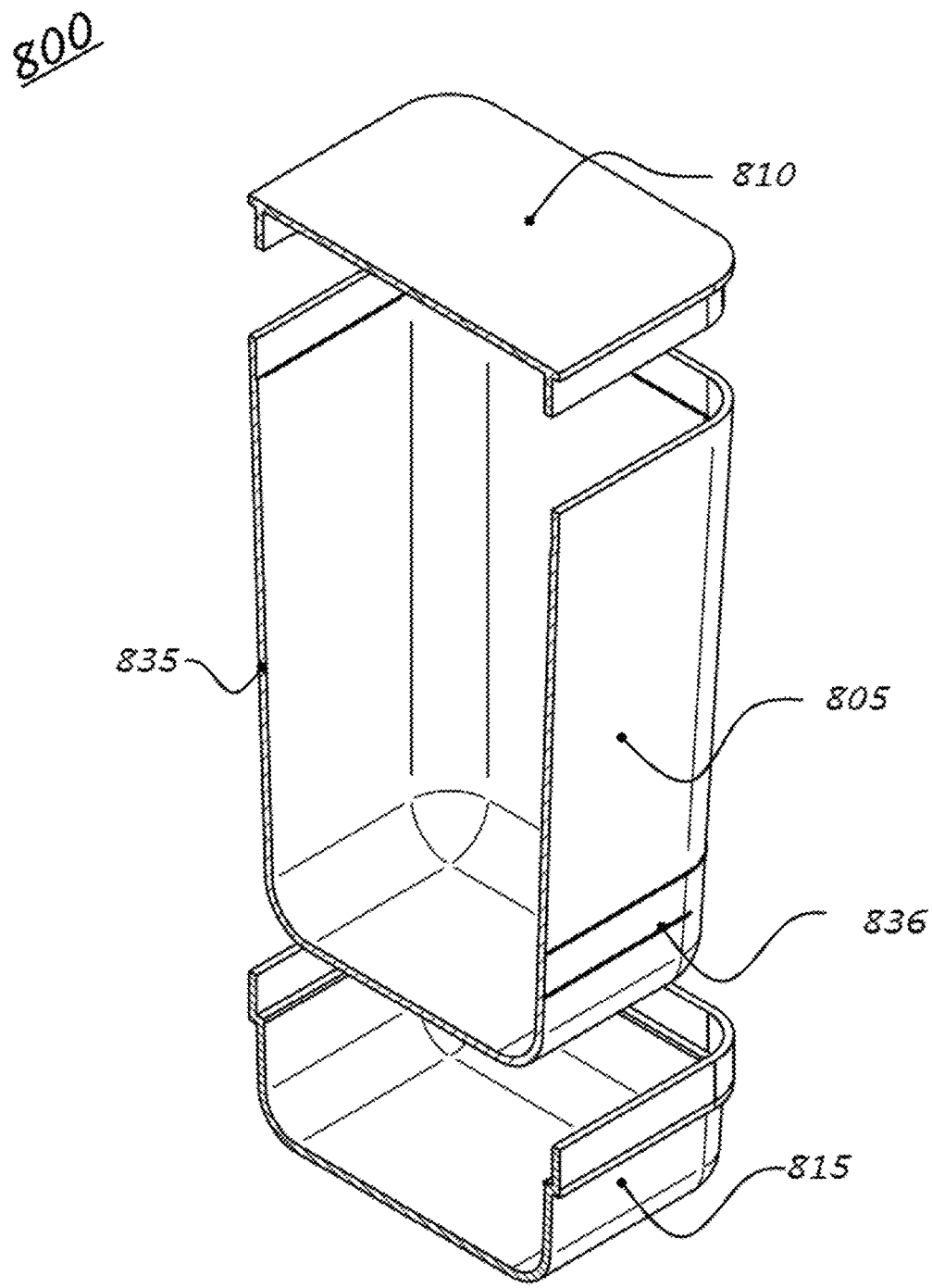
Figure 8F:
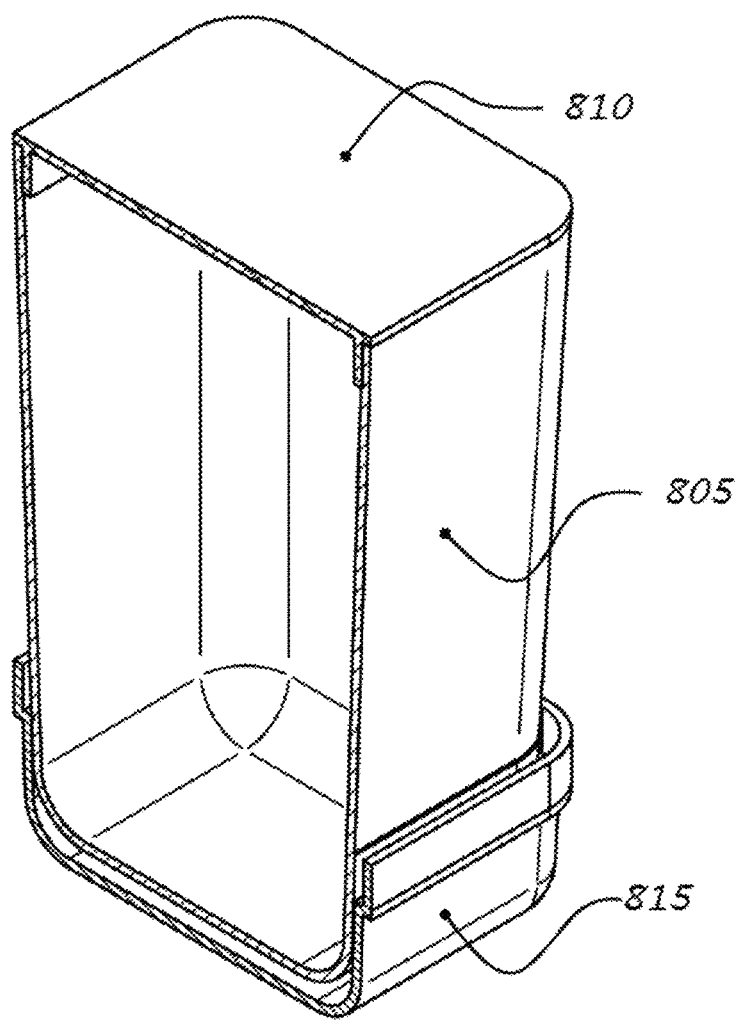

FIGS. 8E and 8F are vertical cross section views of container system 800, illustrating sub-container 815 positioned below main container 805. FIG. 8E illustrates and exploded view of container system 800, with sub-container 815 separate from main container 805. FIG. 8F is an illustration of a sub-container 815 matingly adjoined to main container 805.

Figure 8G:
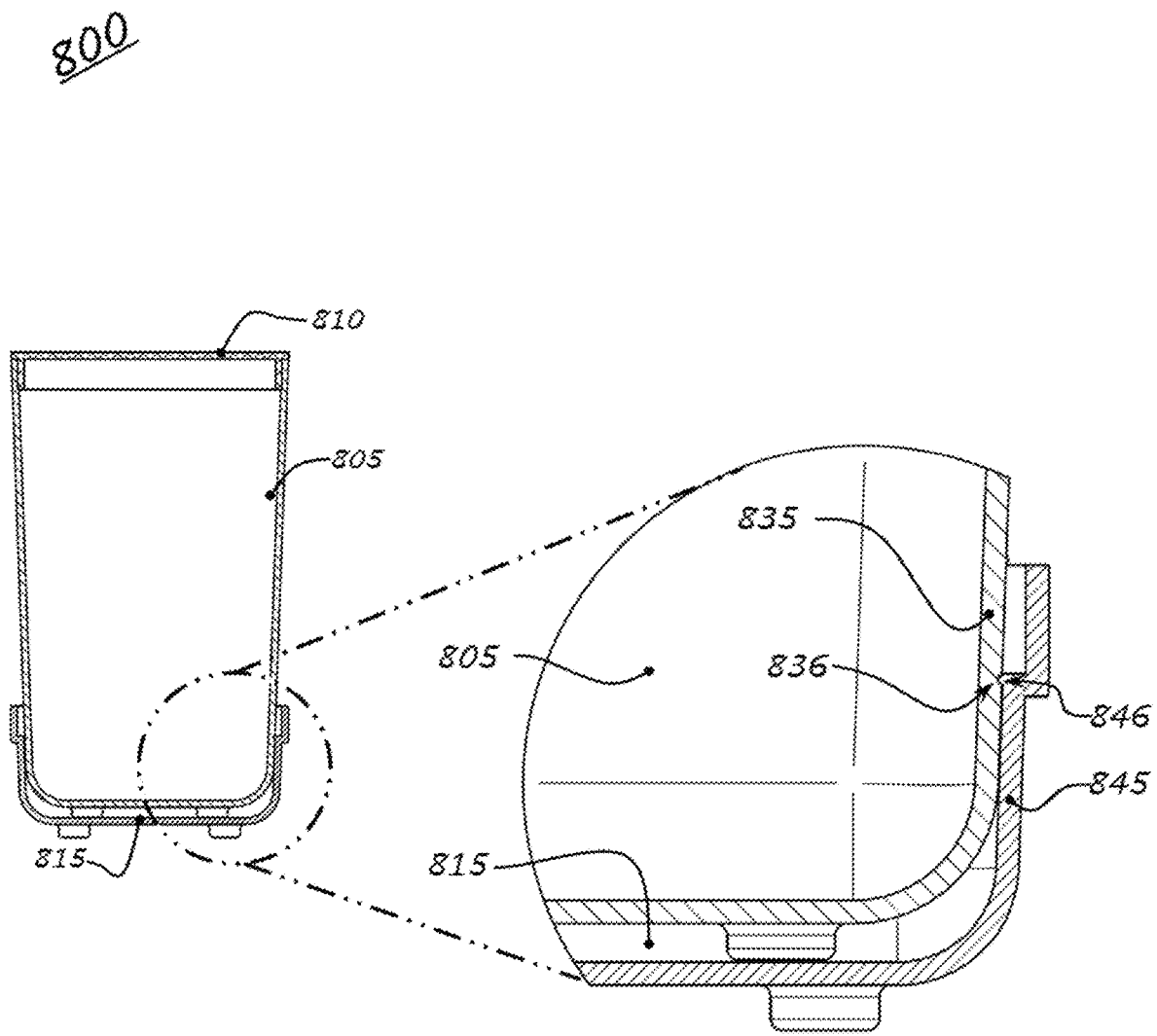

FIG. 8G is a zoomed-in inset view of sub-container 815 matingly adjoined to main container 805. Here it can be seen that container coupling 836 on the outer face of main container side wall 835 is matingly adjoined with container coupling 846 on the inner face of sub-container side wall 845.

Figure 8H:
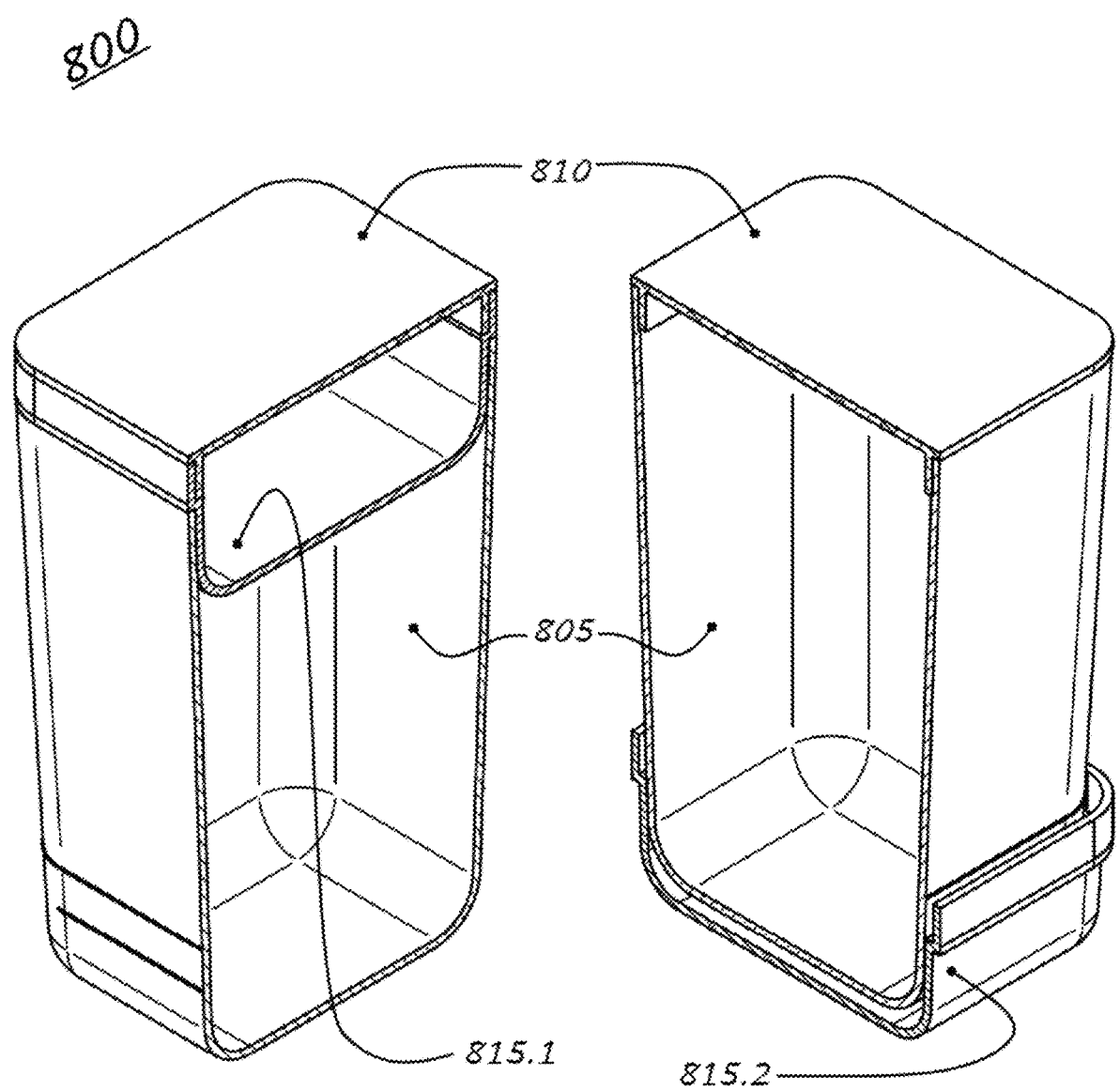

FIG. 8H is a vertical cross section view of container system 800. On the left is an illustration showing sub-container 815.1 inserted in the top of, and forming a largely air-tight seal with a top portion of main container 805; and lid 810 is set atop of, and forming a largely air-tight seal with a top portion of sub-container 815.1. This configuration on the left may be a depiction of sub-container 815.1 in use, e.g., with product stored therein. On the right is an illustration of sub-container 815.2 matingly adjoined to the lower aspect of the main container 805, and held reliably in place by the aforementioned container couplings (e.g., container couplings 836 and 846 of FIG. 8H); lid 810 is set atop of, and forming a largely air-tight seal with main container 805. This configuration on the right of FIG. 8H may be a depiction of sub-container 815.2 in a stowed configuration, according to some embodiments herein. In FIG. 8H, it can also be seen that the overall height of container system 800 when sub-container 815.1 in an "in-use" position (at right) is the same as when sub-container 815.2 is in its stowed position (at left).

As demonstrated by the foregoing use-case examples, container systems 200, 700, and 800 may each provide a container that can accommodate the reliably separated storage of both "older" and "newer" product stock in a single container system via a compatible sub-container, while also allowing for the easy integrated storage of said sub-container integral to container system 200, 700, and 800 respectively.

As demonstrated, use of such a system provides the benefit(s) of efficiently storing a current/existing supply of stock and an inventory supply of product stock that may be use in the future, wherein each store of the product is housed in separate compartments within the same container system. Accordingly, a user need not store both a current/existing supply of stock in a product decanter and an inventory supply of product stock in a separate retail or other storage container. Further, such container systems allow for the "on-board" stowage of their respective sub-containers, obviating the need to store sub-containers separately, and virtually eliminating the risk of a consumer inadvertently misplacing the sub-container. Such sub-container embodiments also provide for container systems where the overall height of the container system remains unchanged regardless of whether each system's sub-container is in its in-use configuration, or its stowed configuration, which contributes to the convenient storage of multiple container systems adjacent to, and stacked upon one another.

In some embodiments, aspects of container system 200, 700, and 800 may include a relatively uniform shape. For example, each of these container systems may generally comprise walls which are at substantially right angles to their bottom walls. As such, multiples of each container system may be neatly and efficiently stacked or configured on a shelf or counter, thereby maximizing the use of such spaces while providing, for example, a container that can accommodate both "older" and "newer" product stock in a single container system.

In addition to the exemplary embodiments described hereinabove, it will be understood that the foregoing description is of exemplary embodiments of the present disclosure and that the invention herein is not limited to the specific forms shown or described. Modifications may be made in the design and arrangement of these elements without departing from the scope of the invention as expressed in the claims.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A container system, comprising:
a main container having a bottom wall and a plurality of sidewalls integrally connected to the bottom wall, the bottom wall and sidewalls having an interior face defining a first interior holding area;
a sub-container having a bottom wall and a plurality of sidewalls integrally connected to the bottom wall, the bottom wall of the sub-container and the sidewalls of the sub-container having an interior face defining a second interior holding area; and
a lid formed to removably mate with a top portion of the sub-container to enclose the second interior holding area, the lid and the sub-container forming a structure formed to removably mate with a top portion of the main container to enclose the first interior holding area;
wherein the first interior holding area is sized to hold a first volume of a product and the second interior holding area is sized to hold a second volume of a product when the lid and the sub-container form the structure;
wherein at least a portion of the sub-container is collapsible, wherein a volume of the second interior holding area is increased when the portion of the sub-container is in a non-collapsed position; and
wherein the main container has a visible indicator of a refill volume and the volume of the second interior holding area when increased is substantially equal to the refill volume.

2. The container system of claim 1, wherein a volume of the first interior holding area is increased when the portion of the sub-container is in a collapsed position.

3. The container system of claim 1, wherein the main container has an outer profile that is substantially rectangular in profile.

4. The container system of claim 1, wherein the main container has an outer profile that is substantially cylindrical in profile.

5. The container system of claim 1, wherein the second interior holding area is fixed in size and the plurality of sidewalls of the sub-container have a lower portion that fits in the first interior holding area and an upper portion that removably sits on top of the plurality of sidewalls of the main container to enclose the first interior holding area.

6. The container system of claim 1, wherein the sub-container further comprises a coupling mechanism to engage with the lid.

7. A container system, comprising:
a main container having a bottom wall and a plurality of sidewalls integrally connected to the bottom wall, the bottom wall and sidewalls having an interior face defining a first interior holding area;
a sub-container having a bottom wall and a plurality of sidewalls integrally connected to the bottom wall, the bottom wall of the sub-container and the sidewalls of the sub-container having an interior face defining a second interior holding area, wherein at least a portion of the sub-container is collapsible, wherein a volume of the second interior holding area is increased when the portion of the sub-container is in a non-collapsed position; and
a lid formed to removably mate with a top portion of the sub-container to enclose the second interior holding area, the lid and the sub-container forming a structure formed to removably mate with a top portion of the main container to enclose the first interior holding area;
wherein the main container has a visible indicator of a refill volume and the volume of the second interior holding area when increased is substantially equal to the refill volume.

8. The container system of claim 7, wherein the main container has an outer profile that is substantially rectangular in profile.

9. The container system of claim 7, wherein the main container has an outer profile that is substantially cylindrical in profile.

10. The container system of claim 7, wherein the second interior holding area is fixed in size and the plurality of sidewalls of the sub-container have a lower portion that fits in the first interior holding area and an upper portion that removably sits on top of the plurality of sidewalls of the main container to enclose the first interior holding area.

11. The container system of claim 7, wherein the sub-container further comprises a coupling mechanism to engage with the lid.

\* \* \* \* \*